United States Patent [19]
Madabhushi

[11] Patent Number: 5,801,871
[45] Date of Patent: Sep. 1, 1998

[54] WIDE BAND AND LOW DRIVING VOLTAGE OPTICAL MODULATOR WITH IMPROVED CONNECTOR PACKAGE

[75] Inventor: Rangaraj Madabhushi, Tokyo, Japan

[73] Assignee: NEC Corporation, Tokyo, Japan

[21] Appl. No.: 855,888

[22] Filed: May 12, 1997

[30] Foreign Application Priority Data

May 10, 1996 [JP] Japan ................... 8-116436

[51] Int. Cl.$^6$ ................... G02F 1/03
[52] U.S. Cl. ................... 359/245; 385/2; 385/3
[58] Field of Search ................... 385/2, 3; 359/245

[56] References Cited

U.S. PATENT DOCUMENTS

| | | | |
|---|---|---|---|
| 5,214,724 | 5/1993 | Seino et al. | 385/2 |
| 5,408,544 | 4/1995 | Seino | 385/3 |

OTHER PUBLICATIONS

M. Rangaraj et al., "A Wide–Band Ti : LiNbO$_3$ Optical Modulator with a Conventional Coplanar Waveguide Type Electrode", pp. 1020–1022, IEEE Photonics Technology Letters, vol. 4, No. 9, Sep. 1992.

Primary Examiner—Mark Hellner
Attorney, Agent, or Firm—Young & Thompson

[57] ABSTRACT

A connector is provided for connecting to a pad of a signal electrode selectively formed over a dielectric buffer layer which extends over a crystal substrate of an optical device wherein a recess is selectively formed in an upper region of the crystal substrate so that the recess is positioned in the vicinity of the pad. The dielectric buffer layer and the signal electrode are not formed over the recess so that the connector is received securely in the recess whereby a side face of the connector is made into directly contact with a side face of the pad, and a top of the connector has substantially the same level as a top of the pad to allow a majority of microwave to travel between top surface regions of the pad and the connector without substantial loss.

60 Claims, 7 Drawing Sheets

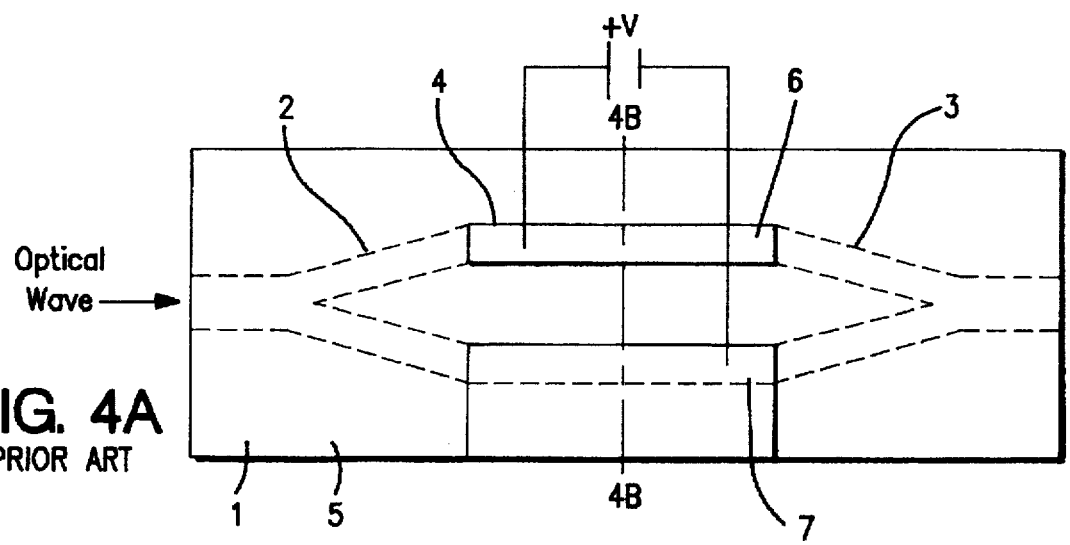
FIG. 4A
PRIOR ART
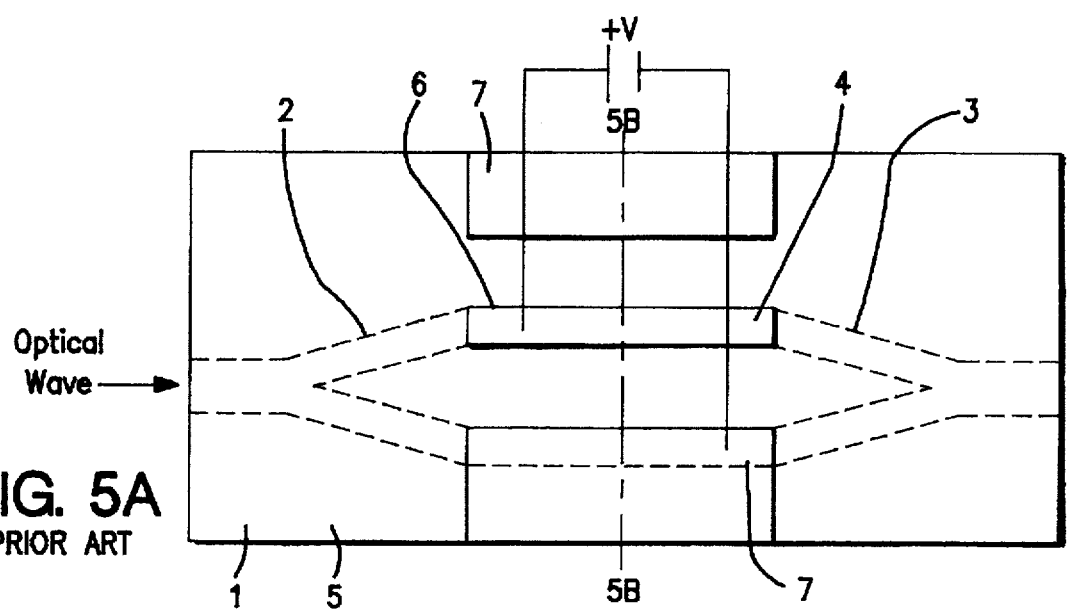
FIG. 5A
PRIOR ART
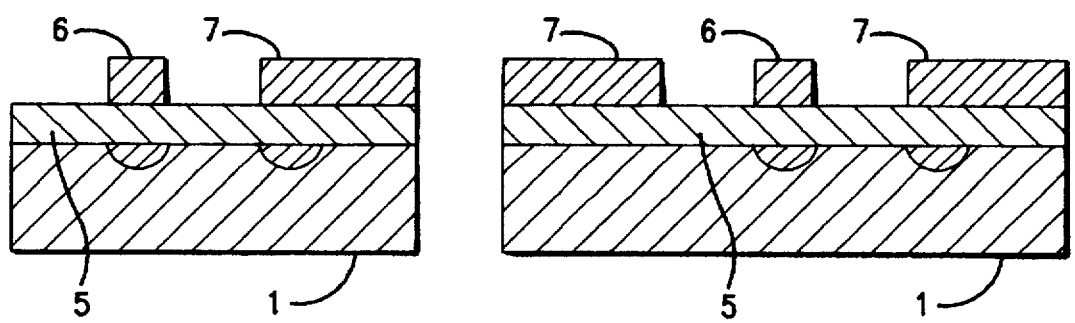
FIG. 4B
PRIOR ART
FIG. 5B
PRIOR ART

WIDE BAND AND LOW DRIVING VOLTAGE OPTICAL MODULATOR WITH IMPROVED CONNECTOR PACKAGE

BACKGROUND OF THE INVENTION

The present invention relates to an optical device, and more particularly to an optical device such as waveguide optical modulators and waveguide optical switches used in high speed optical communications, optical switching networks, optical information processing, image processing and other various optical systems.

The waveguide optical modulators and waveguide optical switches are extremely important for realizing the high speed optical communications, optical switching networks, optical information processing, image processing and other various optical systems.

The waveguide optical modulators may be fabricated on a few kinds of attracted substrates. The studies of the waveguide optical devices have been likely to focus on $LiNbO_3$ substrate or semiconductor substrates such as GaAs substrate. A low loss strip type optical waveguide may be formed in an upper region of the $LiNbO_3$ substrate by selective diffusion of titanium into the upper region of the $LiNbO_3$ substrate.

The most important parameters for the waveguide optical modulators are driving voltage, modulation bandwidth and insertion loss. A low driving voltage, a wide bandwidth and a low insertion loss are desired. Notwithstanding, the driving voltage and the modulation bandwidth have a relationship of trade-off each other. Namely, it was difficult to satisfy the requirements for reduction in the driving voltage and widening the bandwidth concurrently. In this circumstances, the studies of the waveguide optical modulators have been focusing on the optimization of the trade-off relationship between the driving voltage and the bandwidth.

It had been known in the technical field to which the invention pertains that the bandwidth of the waveguide optical modulators mainly depends upon the kind, material and placement of the electrode and a dielectric constant of the substrate. A traveling wave electrode is useful for wide band modulation. The traveling wave electrode is configured as an extension from a driving power transmission line, for which reason a characteristic impedance of the traveling wave electrode is required to be equal to a characteristic impedance of a power supply or a cable. In this case, a modulation speed is defined by a difference in traveling time, phase velocity or effective refractive index between optical wave and microwave. Useable traveling wave electrodes are asymmetric strip line type electrode, asymmetric coplanar strip type electrode, and coplanar waveguide type electrode.

A conventional Mach-Zehnder optical modulator as one of the typical optical modulators is illustrated in FIGS. 1, 2A and 2B. FIG. 1 is a plane view illustrative of the first conventional Mach-Zehnder optical modulator including a dielectric buffer layer having a constant thickness. FIG. 2A is a cross sectional elevation view illustrative of the first conventional Mach-Zehnder optical modulator taken along an A-B line in FIG. 1. FIG. 2B is a cross sectional elevation view illustrative of the first conventional Mach-Zehnder optical modulator taken along a C-D line in FIG. 1.

A crystal substrate 1, for example, a $LiNbO_3$ substrate is used. A titanium film strip is formed on a top surface of the crystal substrate 1, wherein the titanium film strip comprises two straight arms and two Y-shaped portions coupled to opposite sides of the two straight arms. The crystal substrate 1 was then subjected to a heat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm phase shifter portions 4 coupled to the Y-shaped optical divider portion 2, and a Y-shaped optical coupler portion 3 coupled to the two straight arm phase shifter portions 4. The top surface of the titanium-diffused optical waveguide has the same level as the top surface of the crystal substrate 1 to form a flat surface. A dielectric buffer layer 5, for example, $SiO_2$ buffer layer is provided entirely on the flat surface so that the dielectric buffer layer 5 extends over the optical waveguide and the crystal substrate 1. The dielectric buffer layer 5 has a constant thickness.

A coplanar waveguide type electrode is selectively provided on the dielectric buffer layer 5. The coplanar waveguide type electrode structure comprises a signal electrode 6 and two ground electrodes 7.

Here, a first one of the two straight arm phase shifter portions 4 is defined as having a larger value on the X-coordinate, while a second one of the two straight arm phase shifter portions 4 is defined as having a smaller value on the X-coordinate.

The signal electrode 6 extends in the Y-direction and over the dielectric buffer layer 5 over the first one of the two straight arm phase shifter portions 4 so that the signal electrode 6 entirely covers in the plane view the first one of the two straight arm phase shifter portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm phase shifter portions 4. A first one of the two ground electrodes 7 extends over the dielectric buffer layer 5 over the second one of the two straight arm phase shifter portions 4 so that the first one of the two ground electrodes 7 entirely covers in the plane view the second one of the two straight arm phase shifter portions 4. The first one of the two ground electrodes 7 further extends over the dielectric buffer layer 5 over the crystal substrate 1 on lower regions on the X-coordinate than and outside the second one of the two straight arm phase shifter portions 4. The first one of the two ground electrodes 7 is separated in the plane view from the signal electrode 6. A second one of the two ground electrodes 7 extends over the dielectric buffer layer 5 so that the second one of the two ground electrodes 7 is positioned outside the signal electrode 6 but separated in the plane view from the signal electrode 6.

Optical fiber mounts 9 are provided at opposite end portions of the titanium-diffused optical waveguide so that the Y-shaped optical divider portion 2 and the Y-shaped optical coupler portion 3 are coupled via the optical fiber mounts 9 to optical fibers.

A microwave is applied through the connector package 8 to the signal electrode 6. If no phase shift is provided between the two straight arm phase shifter portions 4, then optical waves having been traveled through the two straight arm phase shifter portions 4 have the same phase as each other. For which reason, when the optical waves with the same phase are then coupled by the optical coupler 3, the intensity of optical wave to be output from the modulator remains unchanged from that of the incident optical wave.

If a high voltage is applied to the signal electrode 6, a phase shift at $\pi$ is provided between the two straight arm phase shifter portions 4 whereby optical waves having been traveled through the two straight arm phase shifter portions 4 have a difference in phase by $\pi$ from each other. For which reason, when the optical waves with the same phase are then coupled by the optical coupler 3, an offset interference is raised between the coupled optical waves whereby the intensity of the coupled optical wave is zero or almost zero as the minimum value. The optical modulator shows ON-OFF operations as described above.

A second conventional Mach-Zehnder optical modulator with asymmetric strip line type electrodes is illustrated in FIGS. 3A and 3B. Except for the electrodes, the structure of the Mach-Zehnder optical modulator is substantially the same as described above with reference to FIGS. 1, 2A and 2B.

A third conventional Mach-Zehnder optical modulator with asymmetric coplanar strip type electrodes is illustrated in FIGS. 4A and 4B. Except for the electrodes, the structure of the Mach-Zehnder optical modulator is substantially the same as described above with reference to FIGS. 1, 2A and 2B.

A fourth conventional Mach-Zehnder optical modulator with asymmetric coplanar waveguide type electrodes is illustrated in FIGS. 5A and 5B. Except for the electrodes, the structure of the Mach-Zehnder optical modulator is substantially the same as described above with reference to FIGS. 1, 2A and 2B.

As described above, the driving voltage and the modulation bandwidth have a relationship of trade-off each other. The bandwidth of the waveguide optical modulators mainly depends upon the kind, material and placement of the electrode and a dielectric constant of the substrate. On the other hand, the driving voltage mainly depends upon an overlap integral of electric wave, for example, microwave and optical wave, more accurately an overlap integral of a profile of the electric field and an optical mode field profile. As the overlap integral is decreased, then the driving voltage is increased. As the overlap integral is increased, then the driving voltage is decreased. Further, as the thickness of the dielectric buffer layer is increased, the overlap integral is decreased. As the thickness of the dielectric buffer layer is decreased, the overlap integral is increased. Consequently, if the thickness of the dielectric buffer layer is increased, then the driving voltage is also increased. If the thickness of the dielectric buffer layer is decreased, then the driving voltage is also decreased. In the light of reduction in driving voltage, it is preferable to reduce the thickness of the dielectric buffer layer.

1. DRIVING VOLTAGE

Here, the relationship of the driving voltage to the overlap integral of the electric field profile and the optical mode field profile will be highlighted.

The electrode is provided over the dielectric buffer layer extending over the optical waveguide so that an electric field is applied by the electrode through the dielectric buffer layer to the optical waveguide whereby a profile of refractive index of the optical waveguide is varied in proportion to the intensity of the applied electric field due to linear electro-optic effect so called "Pockels effect". The variation in refractive index of the optical waveguide causes a electro-optic phase shift thereby causing phase modulation.

The refractive index variation $\Delta n$ electro-optically caused can be represented as a function of an applied voltage V as follows.

$$\Delta n(V) = n_e^3 r_{33} E(x,y)/2 \qquad (1)$$

$$= n_e^3 r_{33} V \Gamma / 2G$$

where "$n_e$" is the abnormal refractive index of the crystal substrate, "$r_{33}$" is the electro-optic constant, "$E(x,y)$" is the electric field applied to the optical waveguide, "V" is the voltage applied to the electrode, "G" is the gap between the signal and ground electrodes, and "$\Gamma$" is the overlap integral of the electric field profile and the optical mode field profile.

The value of the overlap integral depends upon the distance between the signal and ground electrodes, the electric field profile, the optical mode field profile and the thickness of the dielectric buffer layer. The overlap integral "$\Gamma$" is theoretically in the range of 0–1 and given by the following equation.

$$\Gamma = \frac{G \int\int \Phi^2(x,y) E(x,y) dxdy}{V \int\int \Phi^2(x,y) dxdy} \qquad (2)$$

where $\Phi^2$ (x,y) is the two-dimensional optical field, E(x,y) is the two-dimensional electric field. The optical field is different from the applied electric field, for which reason the overlap integral represents an overlap amount between the optical field and the applied electric field.

In order to reduce the driving voltage to be applied to the electrode, it is required to increase the overlap integral "$\Gamma$" as closely to the theoretical maximum value 1 as possible. Notwithstanding, in prior art, the actually obtainable overlap integral "$\Gamma$" is in the range of 0.3–0.6 in consideration of various parameters such as the thickness of the dielectric buffer layer, the width of the signal electrode and the distance between the signal and ground electrodes.

A total amount of the phase shift "$\Delta\beta$" caused at the length "L" of the interaction or the electrode is given by the following equation.

$$\Delta\beta L = 2 \pi n_e^3 r_{33} V \Gamma L/\lambda G \qquad (3)$$

where "$n_e$" is the abnormal refractive index of the crystal substrate, "$r_{33}$" is the electro-optic constant, "V" is the voltage applied to the electrode, "G" is the gap between the signal and ground electrodes, and "$\Gamma$" is the overlap integral of the electric field profile and the optical mode field profile, "$\lambda$" is the operating wavelength, and "G" is the gap between the signal and ground electrodes.

The switching operations or ON-OFF operations are obtainable by shifting the phase by zero and $\pi$ radian. If the applied voltage is zero, then no phase shift is caused whereby the optical modulator or optical switch is placed in the ON-state. If the applied voltage is a predetermined value, then a phase shift by $\pi$ radian is caused whereby the optical modulator is placed in the OFF-state.

In the equation (3), the $\Delta\beta$ L is replaced by $\pi$ before the equation (3) is transformed into the following equation which represents the product of the voltage and the length of interaction or electrode.

$$V_\pi L = \lambda G/(2 n_e^3 r_{33} \Gamma) \qquad (4)$$

$V_\pi$ is the applied voltage causing the phase shift by $\pi$ radian, namely so called "switching voltage". From the above, the overlap integral $\Gamma$ and the switching voltage $V_\pi$ can be calculated as follows. First, the refractive index profile of the optical waveguide is calculated. Second, the optical field profile is calculated by a specific mode calculation. Further, the profile of the applied electric field is also calculated. The overlap integration "Γ" can be calculated from the equation (2) and the switching voltage "$V_\pi L$" or "VL" can be calculated from the equation (4).

2. FREQUENCY RESPONSE AND BANDWIDTH

Frequency response and bandwidth of the traveling wave modulator will be considered. The intensity of the output is determined by the total shift amount of the phase of the traveling wave. The total shift amount of the phase of the traveling wave is given by the following equation.

$$\Delta\Phi(t)=\Delta\Phi_1(t)-\Delta\Phi_2(t) \tag{5}$$

where $\Delta\Phi_1(t)$ and $\Delta\Phi_2(t)$ are respective phase shifts of the first and second arm phase shifter portions of the optical waveguide.

The phase shift $\Delta\Phi(t)$ is also given by the following equation.

$$\Delta\Phi(t)=\{Z/(Z_s+Z)\}(\pi/\lambda)V_g \cos(2\pi ft)L r_{33} n_e^3\, \Gamma\, H(f) \tag{6}$$

where "Z" is the impedance of the optical modulator, "$Z_s$" is the impedance of the light source, "L" is the length of the electrode, "$V_g \cos(2\pi ft)$" is the microwave generation voltage, "λ" is the free space optical wavelength, "$n_e$" is the abnormal refractive index of the crystal substrate, "$r_{33}$" is the electro-optic constant, "Γ" is the overlap integral and H(f) is the frequency response function.

The frequency response function H(f) can be derived from the total phase shift depending upon the frequency which is caused by the applied microwave voltage. The frequency response function H(f) is given by the following equation.

$$H(f) = \frac{[1 - 2e^{-\alpha L}\cos(2u) + 2e^{-2\alpha L}]^{1/2}}{[(\alpha L)^2 + (2u)^2]^{1/2}} \tag{2}$$

where "u" and "α" are respectively given by the following equations.

$$u=\pi f L(n_m-n_o)/C \tag{8}$$

where "f" is the frequency, "L" is the length of the interaction or electrode, "$n_m$" is the refractive index of microwave, "$n_o$" is the is the refractive index of optical wave and "C" is the light velocity.

$$\alpha=\alpha_0(f)^{1/2} \tag{9}$$

where "α" is the microwave attenuation and "$\alpha_0$" is the microwave attenuation constant.

The small signal relative frequency response "$\Phi(f)/\Phi(f=0)$" is given by H(f) in the equation (7).

The bandwidth can be found by solving $H(f)=1/\sqrt{2}$. If there is no loss, H(f) can be transformed into sinc function and the bandwidth is given by the following equation.

$$\text{Bandwidth}=1.4C/[\pi L(n_m-n_o)] \tag{10}$$

However, the bandwidth is generally defined by the microwave attenuation "α" and the velocity mismatch "($n_m-n_o$)". In order to reduce the velocity mismatch "($n_m-n_o$)", it is required to optimize parameters of the dielectric buffer layer and parameters of the electrodes, particularly the width of the signal electrode and the gap between the signal and ground electrodes.

One of the results of optimizations to the parameters of the dielectric buffer layer and the electrodes is disclosed in IEEE Photonics Technology Letters, Vol. 4, No. 9, September 1992 entitled "A Wide-Band Ti:LiNbO$_3$ Optical Modulator with a Conventional Coplanar Waveguide Type Electrode". A bandwidth of 20 GHz and a driving voltage of 5 V were obtained, where the length of electrode is 2.5 cm. A reduction in driving voltage from 5 V to 3 V was dried by increase in the length of the electrode from 2.5 cm to 4 cm, whilst the bandwidth is narrowed. In order to widen the bandwidth without dropping the driving voltage, it is required to reduce the microwave attenuation.

3. MICROWAVE ATTENUATION

Microwave attenuation is caused by the following events:

a) Loss of strip line conductance which is a function of placement of electrode, resistivity of electrode material and parameters of dielectric buffer layer;

b) Dielectric loss which is a function of dielectric constant of LiNbO$_3$ substrate and a loss tangent "tan δ";

c) Loss due to higher mode propagation;

d) Loss due to curvature or tapering of the strip line;

e) Loss due to impedance mismatch between 50 Ω light source and load; and f) Loss due to mounting package and outside package which includes loss due to connector and connector strip line contact.

In the above various factors which cause increase in the microwave attenuation, the most influential factors are the loss due to mounting package and outside package which includes loss due to connector and connector strip line contact. This loss factor has a considerably large weight in the factors of increase in the microwave attenuation. This was confirmed by measuring the microwave loss of the optical modulator having the connector/connector-package in comparison with the optical modulator having a probe and free of connector/connector-package.

FIG. 6 is a diagram illustrative of variation of "S-Parameter" as a microwave transmission versus microwave frequency for both the optical modulator having the connector/connector-package in comparison with the optical modulator having a probe and free of connector/connector-package. FIG. 6 shows the microwave frequency responsibility for the optical modulator having the connector/connector-package in comparison with the optical modulator having a probe and free of connector/connector-package. A difference in the "S-Parameter" as microwave transmission between the connector/connector-package optical modulator and the probe optical modulator is caused by microwave attenuation due to the connectors, connector signal electrode pads, and packages, for which reason it is required to reduce the microwave attenuation as closely to zero as possible.

Consequently, it is required to reduce the microwave attenuation by improvement in the structure of the connector package 10. As described with reference to FIG. 1, the signal electrode 6 has electrode pads 8 which are coupled to the connector so that the microwave is applied through the connector to the signal electrode 6. The connector 9 and connector package 10 differ in shape and level from the signal electrode input/output pads 8 as well illustrated in FIG. 2B. Those differences are caused by the requirement on design of the modulator to the connector which is commercially available. Majority of the microwave travels or propagates on the surface regions of the connector 9 and the signal electrode 6. All of the microwave does not transmit from the connector 9 to the signal electrode 6 because a part of the microwave is lost at that time. This loss of part of the microwave in transmission from the connector 9 to the signal electrode 6 causes an attenuation loss. This makes it difficult to reduce the microwave attenuation. This results in a difficult to widen the bandwidth of the optical modulator.

The bandwidth is defined by the velocity mismatch between the microwave and the optical wave and the microwave attenuation. The microwave attenuation is so large due to the losses of the connector and connector-package and connector-input strip line contact in addition with the strip line conductor loss. For example, the microwave attenuation exceeds 15 GHz. It is necessary to reduce the microwave attenuation to realize the optical modulator with perfect coupling substantially free from the coupling loss.

In prior art, as well illustrated in FIG. 2B, the connector 9 is provided over the input strip line pad 8, for which reason the majority of the microwave propagating the surface regions of the connector 9 is likely to be lost at a connective point between the connector 9 and the input strip line pad 8 having a lower level than the connector 9. Namely, a difference in level between the connector 9 and the input strip line pad 8 causes such a large loss of the microwave, resulting in a large microwave attenuation.

Further, the contact area between the connector 9 and the input strip line pad 8 provides an influence to the microwave attenuation. A large contact area between the connector 9 and the input strip line pad 8 results in a large increase in the microwave attenuation. The connector 9 in FIG. 1 has a cylindrical shape of a radius in the range of 0.3–0.5 mm. This size and shape results in a large contact area between the connector 9 and the input strip line pad 8. In order to reduce the microwave attenuation, it is required to reduce the contact area between the connector 9 and the input strip line pad 8.

In the above circumstances, it had been required to develop a novel optical modulator with an improved connector structure suitable for reduction in microwave attenuation.

SUMMARY OF THE INVENTION

Accordingly, it is an object of the present invention to provide a novel waveguide optical modulator free from the problems and disadvantages as described above.

It is a further object of the present invention to provide a novel waveguide optical modulator with an improved connector structure suitable for reduction in microwave attenuation.

The above and other objects, features and advantages of the present invention will be described in detail with reference to the accompanying drawings.

The present invention provides a connector for connecting to a pad of a signal electrode selectively formed over a dielectric buffer layer which extends over a crystal substrate of an optical device. A recess is selectively formed in an upper region of the crystal substrate so that the recess is positioned in the vicinity of the pad. The dielectric buffer layer and the signal electrode are not formed over the recess so that the connector is received securely in the recess whereby a side face of the connector is made into directly contact with a side face of the pad, and a top of the connector has substantially the same level as a top of the pad to allow a majority of microwave to travel between top surface regions of the pad and the connector without substantial loss.

The present invention also provides a connector for connecting to a pad of a signal electrode selectively formed over a dielectric buffer layer which extends over a crystal substrate of an optical device. The crystal substrate is in directly contact with a secondary substrate. A top surface of the secondary substrate has a higher level by a thickness of the dielectric buffer layer than a top surface of the crystal substrate so that the dielectric buffer layer does not extend over the secondary substrate and that the top surface of the secondary substrate has substantially the same level as a top surface of the dielectric buffer layer. A recess is selectively formed in an upper region of the secondary substrate so that the recess is positioned in the vicinity of the pad. The dielectric buffer layer and the signal electrode are not formed over the recess so that the connector is received securely in the recess whereby a side face of the connector is made into directly contact with a side face of the pad, and a top of the connector has substantially the same level as a top of the pad to allow a majority of microwave to travel between top surface regions of the pad and the connector without substantial loss.

BRIEF DESCRIPTIONS OF THE INVENTION

Preferred embodiments according to the present invention will be described in detail with reference to the accompanying drawings.

FIG. 4A is a plane view illustrative of the third conventional Mach-Zehnder optical modulator.

FIG. 4B is a cross sectional elevation view illustrative of the first conventional Mach-Zehnder optical modulator taken along an A-B line in FIG. 4A.

FIG. 5A is a plane view illustrative of the fourth conventional Mach-Zehnder optical modulator.

FIG. 5B is a cross sectional elevation view illustrative of the first conventional Mach-Zehnder optical modulator taken along an A-B line in FIG. 5A.

DISCLOSURE OF THE INVENTION

Figure 1:
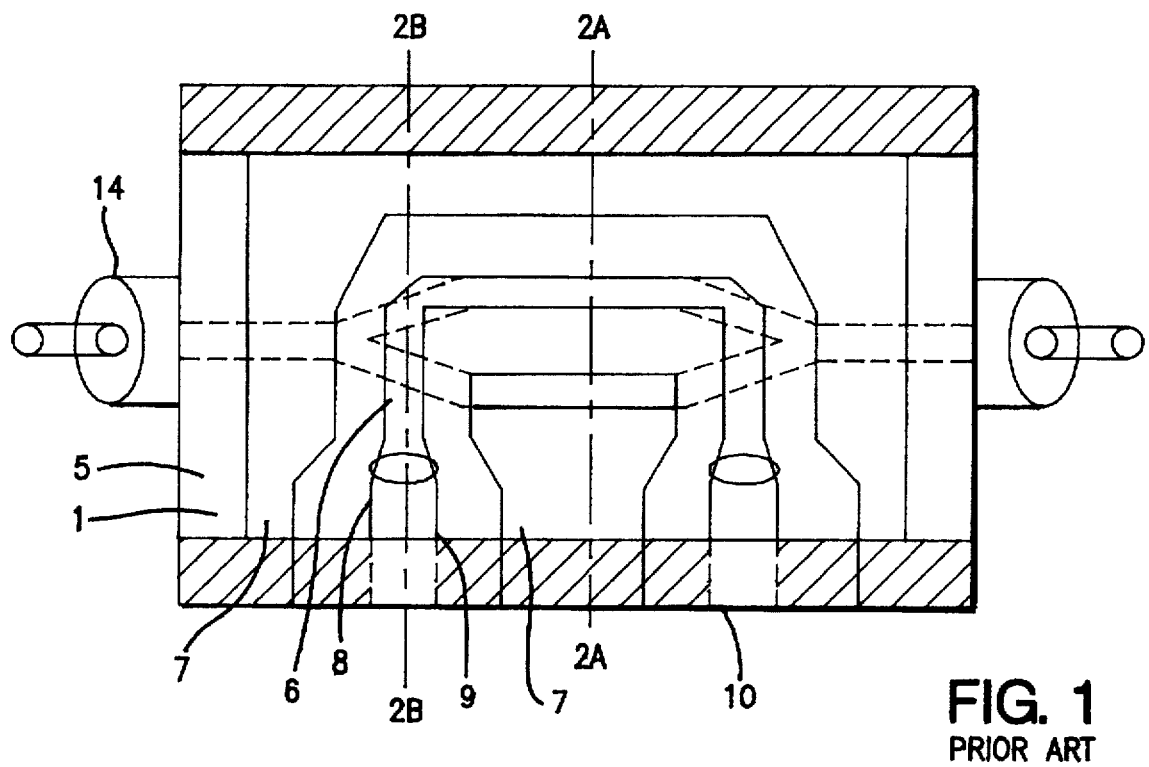
FIG. 1 is a plane view illustrative of the first conventional Mach-Zehnder optical modulator.

The present invention provides a connector for connecting to a pad of a signal electrode selectively formed over a dielectric buffer layer which extends over a crystal substrate of an optical device. A recess is selectively formed in an upper region of the crystal substrate so that the recess is positioned in the vicinity of the pad. The dielectric buffer layer and the signal electrode are not formed over the recess so that the connector is received securely in the recess whereby a side face of the connector is made into directly contact with a side face of the pad, and a top of the connector has substantially the same level as a top of the pad to allow a majority of microwave to travel between top surface regions of the pad and the connector without substantial loss.

It is preferable to further provide an electrically conductive connection member which connects between top surfaces of the pad and the connector so as to allow microwave to travel between top surface regions of the pad and the connector not only directly to each other but also through the electrically conductive connection member. The electrically conductive connection member may comprise an Au ribbon, wiring, or a strip.

The present invention also provides a connector for connecting to a pad of a signal electrode selectively formed over a dielectric buffer layer which extends over a crystal substrate of an optical device. A recess is selectively formed in an upper region of the crystal substrate so that the recess is positioned in the vicinity of the pad. The dielectric buffer layer and the signal electrode are not formed over the recess so that the connector is received securely in the recess whereby a side face of the connector is made adjacent to a side face of the pad, and an electrically conductive connection member is provided to connect between top surfaces of the pad and the connector so as to allow microwave to travel between top surface regions of the pad and the connector through the electrically conductive connection member.

It is preferable that a top of the connector has substantially the same level as a top of the pad.

The electrically conductive connection member may comprise an Au ribbon, wiring, or a strip.

The present invention also provides a connector for connecting to a pad of a signal electrode selectively formed over a dielectric buffer layer which extends over a crystal substrate of an optical device. The crystal substrate is in directly contact with a secondary substrate. A top surface of the secondary substrate has a higher level by a thickness of the dielectric buffer layer than a top surface of the crystal substrate so that the dielectric buffer layer does not extend over the secondary substrate and that the top surface of the secondary substrate has substantially the same level as a top surface of the dielectric buffer layer. A recess is selectively formed in an upper region of the secondary substrate so that the recess is positioned in the vicinity of the pad. The dielectric buffer layer and the signal electrode are not formed over the recess so that the connector is received securely in the recess whereby a side face of the connector is made into directly contact with a side face of the pad, and a top of the connector has substantially the same level as a top of the pad to allow a majority of microwave to travel between top surface regions of the pad and the connector without substantial loss.

It is preferable to further provide an electrically conductive connection member which connects between top surfaces of the pad and the connector so as to allow microwave to travel between top surface regions of the pad and the connector not only directly to each other but also through the electrically conductive connection member. The electrically conductive connection member may comprise an Au ribbon, wiring, or a strip.

The present invention also provides a connector for connecting to a pad of a signal electrode selectively formed over a dielectric buffer layer which extends over a crystal substrate of an optical device. The crystal substrate is in directly contact with a secondary substrate. A top surface of the secondary substrate has a higher level by a thickness of the dielectric buffer layer than a top surface of the crystal substrate so that the dielectric buffer layer does not extend over the secondary substrate and that the top surface of the secondary substrate has substantially the same level as a top surface of the dielectric buffer layer. A recess is selectively formed in an upper region of the secondary substrate so that the recess is positioned in the vicinity of the pad. The dielectric buffer layer and the signal electrode are not formed over the recess so that the connector is received securely in the recess whereby a side face of the connector is made adjacent to a side face of the pad, and an electrically conductive connection member is provided to connect between top surfaces of the pad and the connector so as to allow microwave to travel between top surface regions of the pad and the connector through the electrically conductive connection member.

It is preferable that a top of the connector has substantially the same level as a top of the pad. The electrically conductive connection member may comprise an Au ribbon, wiring, or a strip.

The present invention also provides an optical device comprising the following elements. A crystal substrate is provided with at least an optical waveguide. A dielectric buffer layer extends over the crystal substrate and the optical waveguide. At least a signal electrode selectively provided on the dielectric buffer layer for applying an electric field through at least a part of the dielectric buffer layer to at least a part of the optical waveguide for causing at least the above part of the optical waveguide to vary in refractive index profile in linear-proportion to an intensity of the electric field thereby causing a phase shift of a light which is on propagation in the at least part of the optical waveguide. At least a pad is connected with an end of the signal electrode. The pad is also selectively formed over the dielectric buffer layer. A recess is selectively formed in an upper region of the crystal substrate so that the recess is positioned in the vicinity of the pad. The dielectric buffer layer and the signal electrode are not formed over the recess so that the connector is received securely in the recess whereby a side face of the connector is made into directly contact with a side face of the pad, and a top of the connector has substantially the same level as a top of the pad to allow a majority of microwave to travel between top surface regions of the pad and the connector without substantial loss.

It is preferable to further provide an electrically conductive connection member which connects between top surfaces of the pad and the connector so as to allow microwave to travel between top surface regions of the pad and the connector not only directly to each other but also through the electrically conductive connection member. The electrically conductive connection member may comprise an Au ribbon, wiring, or a strip.

The present invention also provides an optical device comprising the following elements. A crystal substrate is provided with at least an optical waveguide. A dielectric buffer layer extends over the crystal substrate and the optical waveguide. At least a signal electrode is selectively provided on the dielectric buffer layer for applying an electric field through at least a part of the dielectric buffer layer to at least a part of the optical waveguide for causing at least the above part of the optical waveguide to vary in refractive index profile in linear-proportion to an intensity of the electric field thereby causing a phase shift of a light which is on propagation in the at least part of the optical waveguide. At least a pad is connected with an end of the signal electrode. The pad is also selectively formed over the dielectric buffer layer. A recess is selectively formed in an upper region of the crystal substrate so that the recess is positioned in the vicinity of the pad. The dielectric buffer layer and the signal electrode are not formed over the recess so that the connector is received securely in the recess whereby a side face of the connector is made adjacent to a side face of the pad, and an electrically conductive connection member is provided to connect between top surfaces of the pad and the connector so as to allow microwave to travel between top surface regions of the pad and the connector through the electrically conductive connection member.

It is preferable that a top of the connector has substantially the same level as a top of the pad. The electrically conductive connection member may comprise an Au ribbon, wiring, or a strip.

The present invention also provides an optical device comprising the following elements. A crystal substrate is provided with at least an optical waveguide. A dielectric buffer layer extends over the crystal substrate and the optical waveguide. At least a signal electrode is selectively provided on the dielectric buffer layer for applying an electric field through at least a part of the dielectric buffer layer to at least a part of the optical waveguide for causing the at least part of the optical waveguide to vary in refractive index profile in linear-proportion to an intensity of the electric field thereby causing a phase shift of a light which is on propagation in the at least part of the optical waveguide. At least a pad is connected with an end of the signal electrode. The pad is also selectively formed over the dielectric buffer layer. A secondary substrate is in directly contact with the crystal substrate. A top surface of the secondary substrate having a higher level by a thickness of the dielectric buffer layer than a top surface of the crystal substrate so that the dielectric buffer layer does not extend over the secondary substrate and that the top surface of the secondary substrate has substantially the same level as a top surface of the dielectric buffer layer. A recess is selectively formed in an upper region of the secondary substrate so that the recess is positioned in the vicinity of the pad. The dielectric buffer layer and the signal electrode are not formed over the recess so that the connector is received securely in the recess whereby a side face of the connector is made into directly contact with a side face of the pad, and a top of the connector has substantially the same level as a top of the pad to allow a majority of microwave to travel between top surface regions of the pad and the connector without substantial loss.

It is preferable to further provide an electrically conductive connection member which connects between top surfaces of the pad and the connector so as to allow microwave to travel between top surface regions of the pad and the connector not only directly to each other but also through the electrically conductive connection member. The electrically conductive connection member may comprise an Au ribbon, wiring, or a strip.

The present invention also provides an optical device comprising the following elements. A crystal substrate is provided with at least an optical waveguide. A dielectric buffer layer extends over the crystal substrate and the optical waveguide. At least a signal electrode is selectively provided on the dielectric buffer layer for applying an electric field through at least a part of the dielectric buffer layer to at least a part of the optical waveguide for causing at least the above part of the optical waveguide to vary in refractive index profile in linear-proportion to an intensity of the electric field thereby causing a phase shift of a light which is on propagation in the at least part of the optical waveguide. At least a pad is connected with an end of the signal electrode. The pad is also selectively formed over the dielectric buffer layer. A secondary substrate is in directly contact with the crystal substrate. A top surface of the secondary substrate has a higher level by a thickness of the dielectric buffer layer than a top surface of the crystal substrate so that the dielectric buffer layer does not extend over the secondary substrate and that the top surface of the secondary substrate has substantially the same level as a top surface of the dielectric buffer layer. A recess is selectively formed in an upper region of the secondary substrate so that the recess is positioned in the vicinity of the pad. The dielectric buffer layer and the signal electrode are not formed over the recess so that the connector is received securely in the recess whereby a side face of the connector is made adjacent to a side face of the pad, and an electrically conductive connection member is provided to connect between top surfaces of the pad and the connector so as to allow microwave to travel between top surface regions of the pad and the connector through the electrically conductive connection member.

It is preferable that a top of the connector has substantially the same level as a top of the pad. The electrically conductive connection member may comprise an Au ribbon, wiring, or a strip.

The present invention also provides a Mach-Zehnder optical modulator comprising the following elements. A crystal substrate is capable of causing an electro-optical effect. The crystal substrate comprises an active region, a first passive region in directly contact with a first side of the active region and a second passive region in directly contact with a second side opposite to the first side of the active region. An optical waveguide extends over the active region and the first and second passive regions of the crystal substrate. The optical waveguide comprises a Y-shaped optical divider portion provided on the first passive region, first and second straight arm portions provided in parallel to each other on the active region and coupled to the Y-shaped optical divider portion, and a Y-shaped optical coupler portion provided on the second passive region and coupled to the first and second straight arm portions. A top surface of the optical waveguide and a surface of the crystal substrate form a flat surface. A dielectric buffer layer extending over the flat surface. A signal electrode is selectively provided on the buffer layer over the first straight arm portion for applying an electric field through the dielectric layer to the first straight arm portion for causing the first straight arm portion to vary in refractive index profile in linear-proportion to an intensity of the electric field thereby causing phase shift of a light which is on propagation in the first straight arm portion. A ground electrode is selectively provided on the buffer layer over the second straight arm portion. At least a pad is connected with an end of the signal electrode. The pad is also selectively formed over the dielectric buffer layer. A recess is selectively formed in an upper region of the crystal substrate so that the recess is positioned in the vicinity of the pad. The dielectric buffer layer and the signal electrode are not formed over the recess so that the connector is received securely in the recess whereby a side face of the connector is made into directly contact with a side face of the pad, and a top of the connector has substantially the same level as a top of the pad to allow a majority of microwave to travel between top surface regions of the pad and the connector without substantial loss.

It is preferable to further provide an electrically conductive connection member which connects between top surfaces of the pad and the connector so as to allow microwave to travel between top surface regions of the pad and the connector not only directly to each other but also through the electrically conductive connection member. The electrically conductive connection member may comprise an Au ribbon, wiring, or a strip.

The present invention also provides a Mach-Zehnder optical modulator comprising the following elements. A crystal substrate is capable of causing an electro-optical effect. The crystal substrate comprises an active region, a first passive region in directly contact with a first side of the active region and a second passive region in directly contact with a second side opposite to the first side of the active region. An optical waveguide extends over the active region and the first and second passive regions of the crystal substrate. The optical waveguide comprises a Y-shaped optical divider portion provided on the first passive region, first and second straight arm portions provided in parallel to each other on the active region and coupled to the Y-shaped optical divider portion, and a Y-shaped optical coupler portion provided on the second passive region and coupled to the first and second straight arm portions. A top surface of the optical waveguide and a surface of the crystal substrate form a flat surface. A dielectric buffer layer extending over the flat surface. A signal electrode is selectively provided on the buffer layer over the first straight arm portion for applying an electric field through the dielectric layer to the first straight arm portion for causing the first straight arm portion to vary in refractive index profile in linear-proportion to an intensity of the electric field thereby causing phase shift of a light which is on propagation in the first straight arm portion. A ground electrode is selectively provided on the buffer layer over the second straight arm portion. At least a pad is connected with an end of the signal electrode. The pad is also selectively formed over the dielectric buffer layer. A recess is selectively formed in an upper region of the crystal substrate so that the recess is positioned in the vicinity of the pad. The dielectric buffer layer and the signal electrode are not formed over the recess so that the connector is received securely in the recess whereby a side face of the connector is made adjacent to a side face of the pad, and an electrically conductive connection member is provided to connect between top surfaces of the pad and the connector so as to allow microwave to travel between top surface regions of the pad and the connector through the electrically conductive connection member.

It is preferable that a top of the connector has substantially the same level as a top of the pad. The electrically conductive connection member may comprise an Au ribbon, wiring, or a strip.

The present invention also provides a Mach-Zehnder optical modulator comprising the following elements. A crystal substrate is capable of causing an electro-optical effect. The crystal substrate comprises an active region, a first passive region in directly contact with a first side of the active region and a second passive region in directly contact with a second side opposite to the first side of the active region. An optical waveguide extends over the active region and the first and second passive regions of the crystal substrate. The optical waveguide comprises a Y-shaped optical divider portion provided on the first passive region, first and second straight arm portions provided in parallel to each other on the active region and coupled to the Y-shaped optical divider portion, and a Y-shaped optical coupler portion provided on the second passive region and coupled to the first and second straight arm portions. A top surface of the optical waveguide and a surface of the crystal substrate form a flat surface. A dielectric buffer layer extending over the flat surface. A signal electrode is selectively provided on the buffer layer over the first straight arm portion for applying an electric field through the dielectric layer to the first straight arm portion for causing the first straight arm portion to vary in refractive index profile in linear-proportion to an intensity of the electric field thereby causing phase shift of a light which is on propagation in the first straight arm portion. A ground electrode is selectively provided on the buffer layer over the second straight arm portion. At least a pad is connected with an end of the signal electrode. The pad is also selectively formed over the dielectric buffer layer. A secondary substrate is in directly contact with the crystal substrate. A top surface of the secondary substrate has a higher level by a thickness of the dielectric buffer layer than a top surface of the crystal substrate so that the dielectric buffer layer does not extend over the secondary substrate and that the top surface of the secondary substrate has substantially the same level as a top surface of the dielectric buffer layer. A recess is selectively formed in an upper region of the secondary substrate so that the recess is positioned in the vicinity of the pad. The dielectric buffer layer and the signal electrode are not formed over the recess so that the connector is received securely in the recess whereby a side face of the connector is made into directly contact with a side face of the pad, and a top of the connector has substantially the same level as a top of the pad to allow a majority of microwave to travel between top surface regions of the pad and the connector without substantial loss.

It is preferable to further provide an electrically conductive connection member which connects between top surfaces of the pad and the connector so as to allow microwave to travel between top surface regions of the pad and the connector not only directly to each other but also through the electrically conductive connection member. The electrically conductive connection member may comprise an Au ribbon, wiring, or a strip.

The present invention also provides a Mach-Zehnder optical modulator comprising the following elements. A crystal substrate is capable of causing an electro-optical effect. The crystal substrate comprises an active region, a first passive region in directly contact with a first side of the active region and a second passive region in directly contact with a second side opposite to the first side of the active region. An optical waveguide extends over the active region and the first and second passive regions of the crystal substrate. The optical waveguide comprises a Y-shaped optical divider portion provided on the first passive region, first and second straight arm portions provided in parallel to each other on the active region and coupled to the Y-shaped optical divider portion, and a Y-shaped optical coupler portion provided on the second passive region and coupled to the first and second straight arm portions. A top surface of the optical waveguide and a surface of the crystal substrate form a flat surface. A dielectric buffer layer extending over the flat surface. A signal electrode is selectively provided on the buffer layer over the first straight arm portion for applying an electric field through the dielectric layer to the first straight arm portion for causing the first straight arm portion to vary in refractive index profile in linear-proportion to an intensity of the electric field thereby causing phase shift of a light which is on propagation in the first straight arm portion. A ground electrode is selectively provided on the buffer layer over the second straight arm portion. At least a pad is connected with an end of the signal electrode. The pad is also selectively formed over the dielectric buffer layer. A secondary substrate is in directly contact with the crystal substrate. A top surface of the secondary substrate has a higher level by a thickness of the dielectric buffer layer than a top surface of the crystal substrate so that the dielectric buffer layer does not extend over the secondary substrate and that the top surface of the secondary substrate has substantially the same level as a top surface of the dielectric buffer layer. A recess is selectively formed in an upper region of the secondary substrate so that the recess is positioned in the vicinity of the pad. The dielectric buffer layer and the signal electrode are not formed over the recess so that the connector is received securely in the recess whereby a side face of the connector is made adjacent to a side face of the pad, and an electrically conductive connection member is provided to connect between top surfaces of the pad and the connector so as to allow microwave to travel between top surface regions of the pad and the connector through the electrically conductive connection member.

It is preferable that a top of the connector has substantially the same level as a top of the pad. The electrically conductive connection member may comprise an Au ribbon, wiring, or a strip.

PREFERRED EMBODIMENTS

First Embodiment

A first embodiment according to the present invention will be described in detail with reference to FIGS. 7, 8A and 8B.

Figure 7:
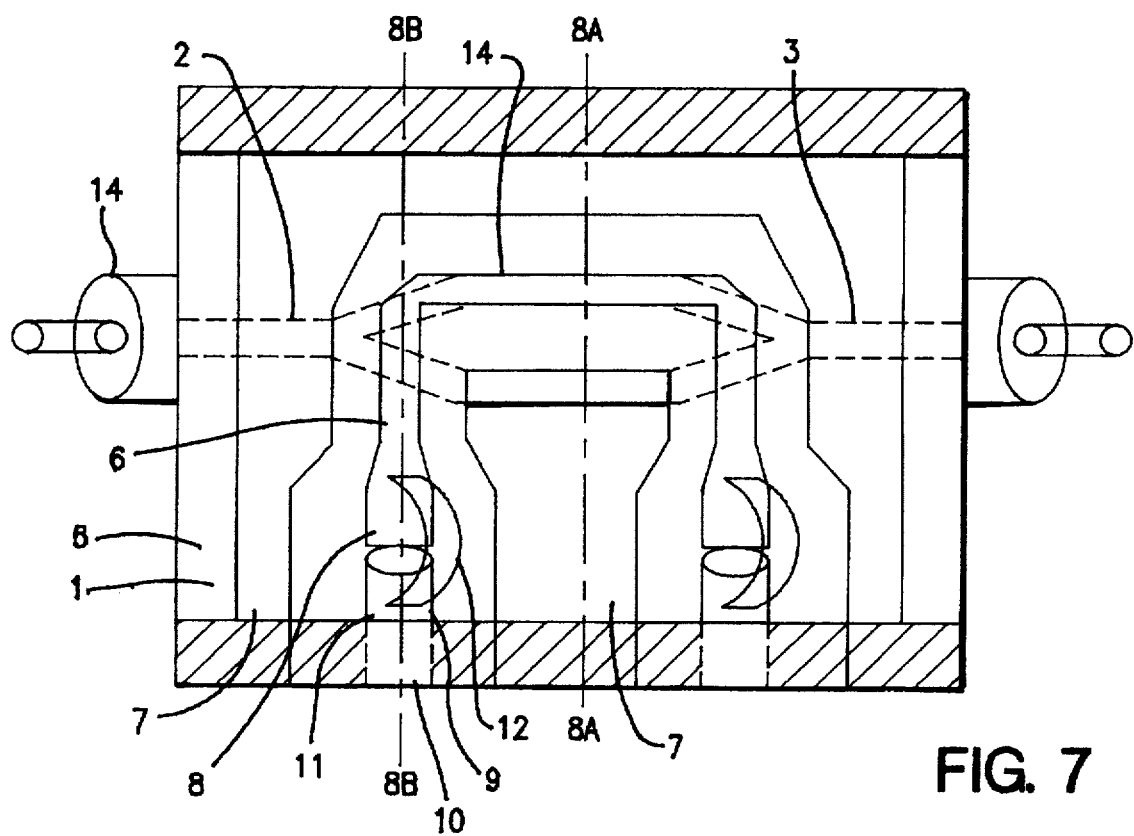
FIG. 7 is a plane view illustrative of a novel Mach-Zehnder optical modulator including an improved connector package in a first embodiment in accordance with the present invention.
Figure 2A:
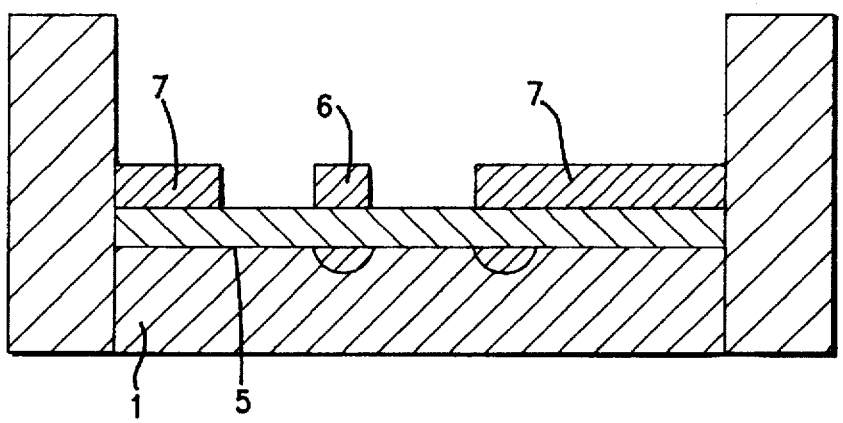
FIG. 2A is a cross sectional elevation view illustrative of the first conventional Mach-Zehnder optical modulator taken along an A-B line in FIG. 1.
Figure 2B:
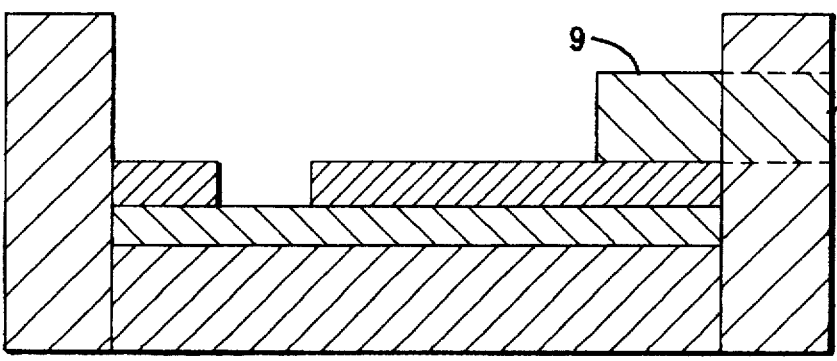
FIG. 2B is a cross sectional elevation view illustrative of the first conventional Mach-Zehnder optical modulator taken along a C-D line in FIG. 1.
Figure 3A:
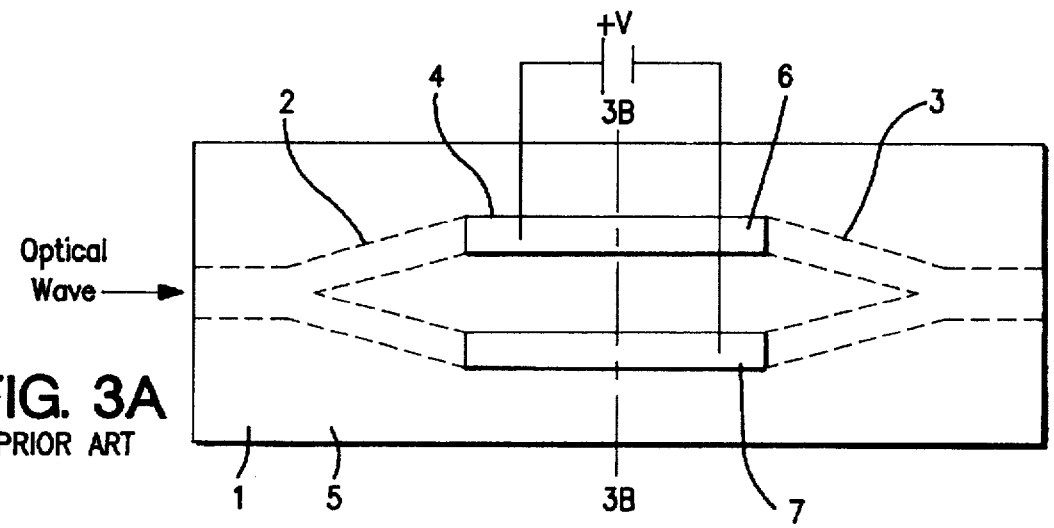
FIG. 3A is a plane view illustrative of the second conventional Mach-Zehnder optical modulator.
Figure 3B:
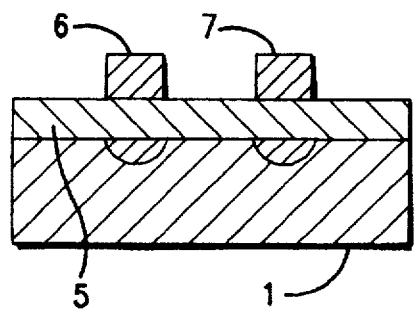
FIG. 3B is a cross sectional elevation view illustrative of the first conventional Mach-Zehnder optical modulator taken along an A-B line in FIG. 3A.
Figure 6:
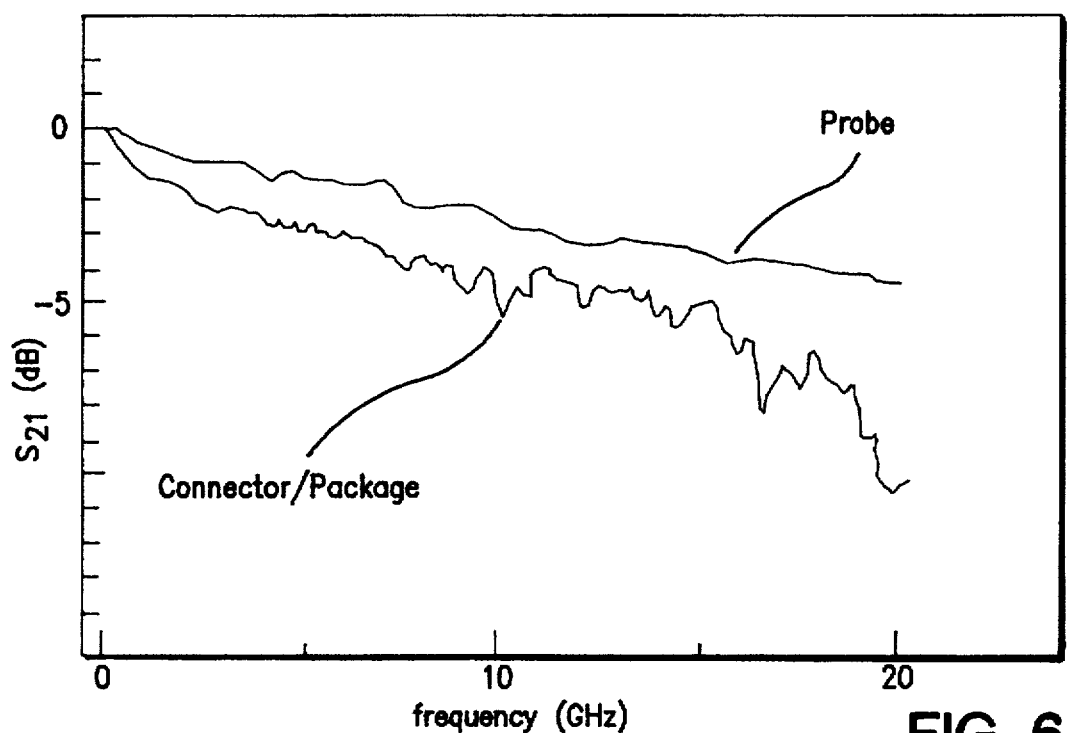
FIG. 6 is a diagram illustrative of variation of "S-Parameter" as a microwave transmission versus microwave frequency for both the optical modulator having the connector/connector-package in comparison with the optical modulator having a probe and free of connector/connector-package.
Figure 8A:
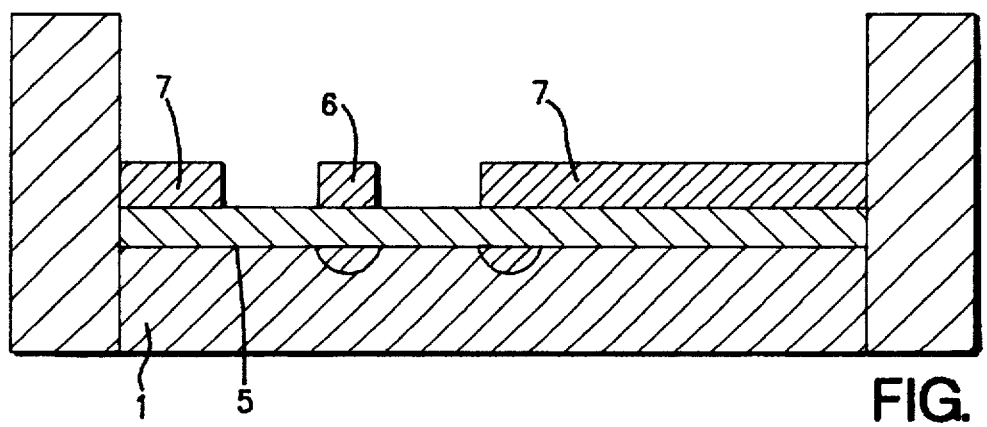
FIG. 8A is a cross sectional elevation view illustrative of a novel Mach-Zehnder optical modulator taken along an A-B line in FIG. 7 in a first embodiment in accordance with the present invention.
Figure 8B:
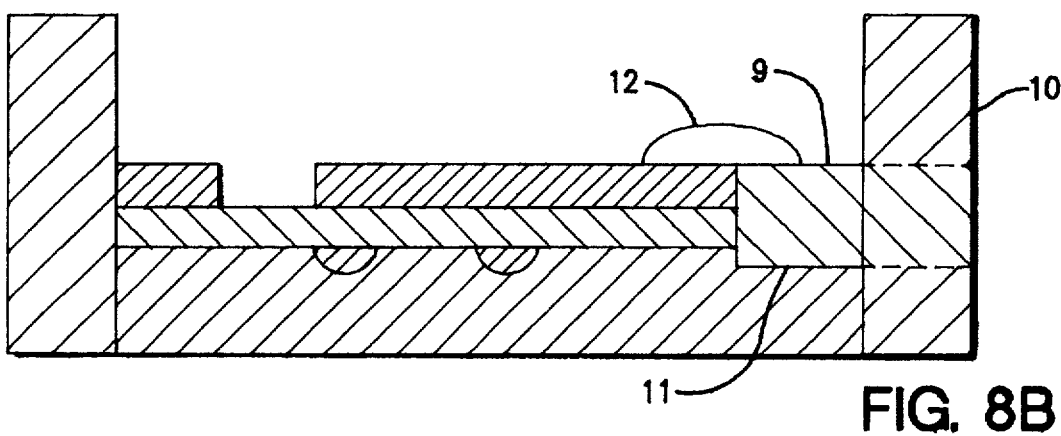
FIG. 8B is a cross sectional elevation view illustrative of a novel Mach-Zehnder optical modulator taken along a C-D line in FIG. 7 in a first embodiment in accordance with the present invention.

FIG. 7 is a plane view illustrative of a novel Mach-Zehnder optical modulator including an improved connector package in a first embodiment in accordance with the present invention. FIG. 8A is a cross sectional elevation view illustrative of a novel Mach-Zehnder optical modulator taken along an A-B line in FIG. 7 in a first embodiment in accordance with the present invention. FIG. 8B is a cross sectional elevation view illustrative of a novel Mach-Zehnder optical modulator taken along a C-D line in FIG. 7 in a first embodiment in accordance with the present invention.

A crystal substrate 1, for example, a $LiNbO_3$ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5–20 micrometers and a thickness of 500–1200 angstroms. The crystal substrate 1 was then subjected to a heat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. The top surface of the titanium-diffused optical waveguide has the same level as the top surface of the crystal substrate 1 to form a flat surface. A dielectric buffer layer 5, for example, $SiO_2$ buffer layer is provided entirely on the flat surface so that the dielectric buffer layer 5 extends over the optical waveguide and the crystal substrate 1. The dielectric buffer layer 5 varies in thickness in the range of 1–10 micrometers. The dielectric buffer layer 5 has a dielectric constant in the range of 1.1–40.

In this embodiment, a coplanar waveguide type electrode structure is selectively provided on the dielectric buffer layer 5, although other electrodes structures may be provided such as asymmetric coplanar strip type electrode structure and asymmetric strip line type electrode structure. The coplanar waveguide type electrode structure comprises a signal electrode 6 and two ground electrodes 7.

Here, a first one of the two straight arm optical modulator portions 4 is defined as having a larger value on the X-coordinate, while a second one of the two straight arm optical modulator portions 4 is defined as having a smaller value on the X-coordinate.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5–20 micrometers and a length in the range of 10–70 millimeters as well as a thickness of 3–40 micrometers.

A first one of the two ground electrodes 7 extends over the dielectric buffer layer 5 over the second one of the two straight arm optical modulator portions 4 so that the first one of the two ground electrodes 7 entirely covers in the plane view the second one of the two straight arm optical modulator portions 4. The first one of the two ground electrodes 7 further extends over the dielectric buffer layer 5 over the crystal substrate 1 on lower regions on the X-coordinate than and outside the second one of the two straight arm optical modulator portions 4. The first one of the two ground electrodes 7 is separated in the plane view from the signal electrode 6 at a distance or gap in the range of 5–200 micrometers.

A second one of the two ground electrodes 7 extends over the dielectric buffer layer 5 so that the second one of the two ground electrodes 7 is positioned outside the signal electrode 6 but separated in the plane view from the signal electrode 6 at a distance or gap in the range of 5–200 micrometers. The distance of the two ground electrodes 7 from the signal electrode 6 is determined so that a ratio of the width of the signal electrode 6 to the distance is in the range of 1–0.1, wherein the width of the signal electrode 6 is in the range of 5–20 micrometers as described above.

The ground electrode 7 has a width in the range of 100–9000 micrometers, a length in the range of 10–70 millimeters and a thickness in the range of 3–40 micrometers.

Optical fiber packages 14 and optical fibers are provided at opposite end portions of the titanium-diffused optical waveguide so that the Y-shaped optical divider portion 2 and the Y-shaped optical coupler portion 3 are coupled via the optical fiber packages 9 to the optical fibers.

The signal electrode 6 has opposite ends which are connected with strip line pads 8. Recesses 11 are selectively formed in the upper region of the substrate 1 so that the recesses 11 are positioned adjacent to the strip line pads 8 connected with the signal electrode 6. As well illustrated in FIG. 8B, the dielectric buffer layer 5 is provided except over the recesses formed in the upper region of the substrate 1. The signal electrode 6 is also formed except over the recesses formed in the upper region of the substrate 1. Namely, laminations of the dielectric buffer layer 5 and the signal electrode 6 are not formed over the recesses 11. The shape of the recesses 11 is decided in accordance with the size and shape of connectors 9 so that the connectors 9 are received securely in the recesses 11. The size of the recesses 11 has a length in the range of 0.2–2 mm, a depth in the range of 0.1–0.5 mm and a width in the range of 0.1–0.6 mm. The recesses 11 may, for example, comprise a V-shaped groove, a rectangle-shaped slit and a cyrindrically shaped slit so as to adjust commercially available various connectors such as OCM-connector, OSSM-connector, K-connector, V-connector. The connectors 9 are attached to connector packages or mounts 10. The connectors 9 attached to connector packages or mounts 10 are then put in the recesses 11 so that the connectors 9 are made adjacent to or into contact with the strip line pads 8 and that the top of the connectors 9 has the same level as the top of the signal electrode 6 as illustrated in FIG. 8B. If the connectors 9 are provided adjacent to the strip line pads 8, the connectors 9 are electrically connected to the strip line pads 8 through connecting members 12 such as Au ribbons, wiring or strips. If, however, the connectors 9 are provided in directly contact with the strip line pads 8.

A microwave is applied through the connector 9 to the strip line pad 8 which is connected with the signal electrode 6. As described above, the majority of the microwave is propagated on the surface region of the conductors, for example, the connector 9 and the signal electrode 6. Namely, the majority of the microwave is propagated on the top surface regions of the connector 9 and the signal electrode 6. However, the top of the connectors 9 has the same level as the top of the signal electrode 6 and the connecting members 12 such as Au ribbons, wiring or strips are provided to connect the surface regions of the connector 9 and the strip line pads 8 as illustrated in FIG. 8B. If the connectors 9 are electrically connected to the strip line pads 8 through the connecting members 12 such as Au ribbons, wiring or strips, the majority of the microwave can travel from the surface region of the connector 9 through the connecting members 12 to the surface region of the strip line pad 8 without any substantial loss. If, however, the connectors 9 are directly contact with the strip line pads 8 so that the top surface of the connectors 9 have the same level as the strip line pads 8, then the majority of the microwave can travel from the surface regions of the connectors 9 to the surface regions of the strip line pads 8 without any substantial loss. In either case, the majority of the microwave can travel from the connector 9 through the strip line pads 8 to the signal electrode 6 without any substantial loss. This connector structure suppresses the increase in the microwave attenuation or allows a considerable reduction in the microwave attenuation.

Second Embodiment

Figure 9:
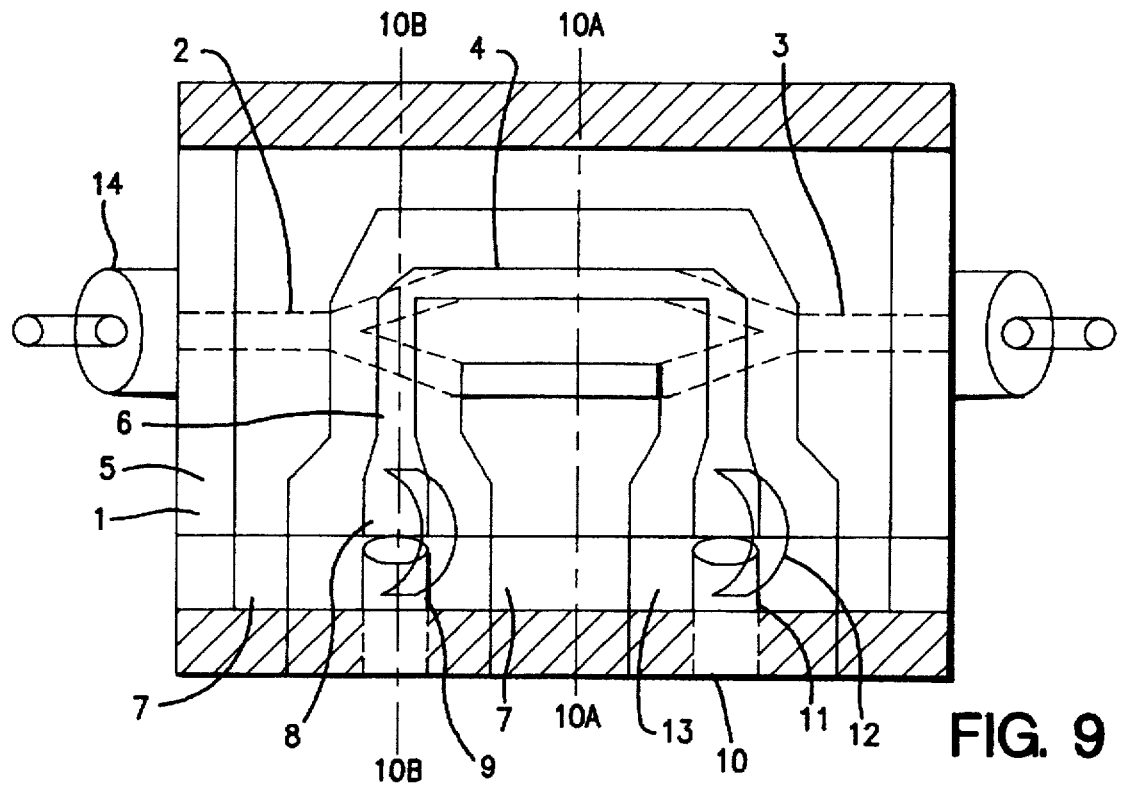
FIG. 9 is a plane view illustrative of a novel Mach-Zehnder optical modulator including an improved connector package in a second embodiment in accordance with the present invention.
Figure 10A:
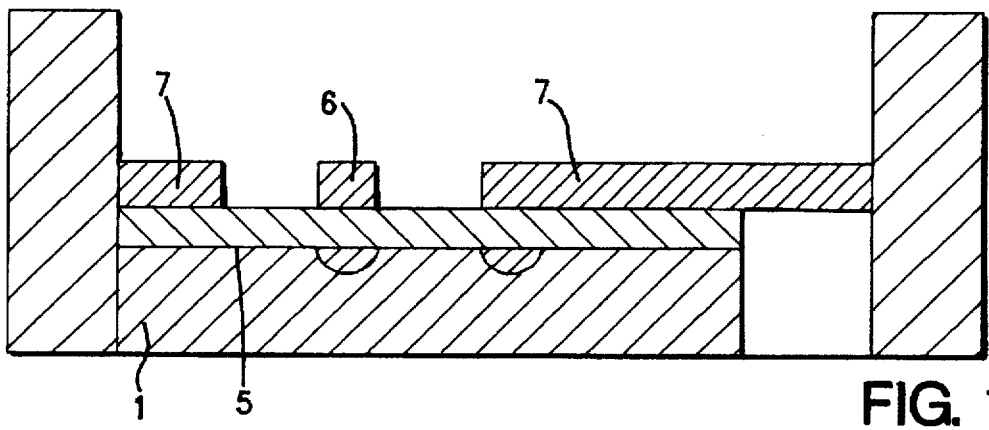
FIG. 10A is a cross sectional elevation view illustrative of a novel Mach-Zehnder optical modulator taken along an A-B line in FIG. 9 in a second embodiment in accordance with the present invention.
Figure 10B:
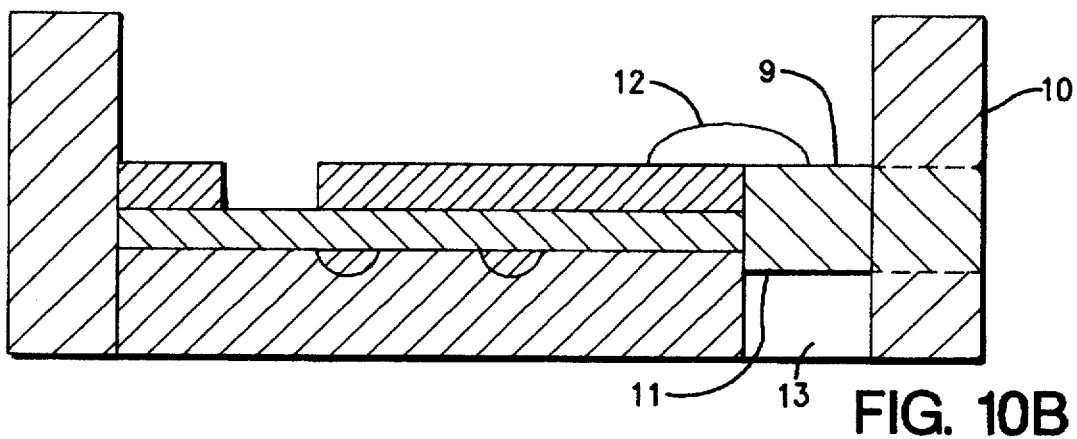
FIG. 10B is a cross sectional elevation view illustrative of a novel Mach-Zehnder optical modulator taken along a C-D line in FIG. 9 in a second embodiment in accordance with the present invention.

A second embodiment according to the present invention will be described in detail with reference to FIGS. 9, 10A and 10B. FIG. 9 is a plane view illustrative of a novel Mach-Zehnder optical modulator including an improved connector package in a second embodiment in accordance with the present invention. FIG. 10A is a cross sectional elevation view illustrative of a novel Mach-Zehnder optical modulator taken along an A-B line in FIG. 9 in a second embodiment in accordance with the present invention. FIG. 10B is a cross sectional elevation view illustrative of a novel Mach-Zehnder optical modulator taken along a C-D line in FIG. 9 in a second embodiment in accordance with the present invention.

A crystal substrate 1, for example, a LiNbO$_3$ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5–20 micrometers and a thickness of 500–1200 angstroms. The crystal substrate 1 was then subjected to a heat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. The top surface of the titanium-diffused optical waveguide has the same level as the top surface of the crystal substrate 1 to form a flat surface. A dielectric buffer layer 5, for example, SiO$_2$ buffer layer is provided entirely on the flat surface so that the dielectric buffer layer 5 extends over the optical waveguide and the crystal substrate 1. The dielectric buffer layer 5 varies in thickness in the range of 1–10 micrometers. The dielectric buffer layer 5 has a dielectric constant in the range of 1.1–40.

In this embodiment, a coplanar waveguide type electrode structure is selectively provided on the dielectric buffer layer 5, although other electrodes structures may be provided such as asymmetric coplanar strip type electrode structure and asymmetric strip line type electrode structure. The coplanar waveguide type electrode structure comprises a signal electrode 6 and two ground electrodes 7.

Here, a first one of the two straight arm optical modulator portions 4 is defined as having a larger value on the X-coordinate, while a second one of the two straight arm optical modulator portions 4 is defined as having a smaller value on the X-coordinate.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5–20 micrometers and a length in the range of 10–70 millimeters as well as a thickness of 3–40 micrometers.

A first one of the two ground electrodes 7 extends over the dielectric buffer layer 5 over the second one of the two straight arm optical modulator portions 4 so that the first one of the two ground electrodes 7 entirely covers in the plane view the second one of the two straight arm optical modulator portions 4. The first one of the two ground electrodes 7 further extends over the dielectric buffer layer 5 over the crystal substrate 1 on lower regions on the X-coordinate than and outside the second one of the two straight arm optical modulator portions 4. The first one of the two ground electrodes 7 is separated in the plane view from the signal electrode 6 at a distance or gap in the range of 5–200 micrometers.

A second one of the two ground electrodes 7 extends over the dielectric buffer layer 5 so that the second one of the two ground electrodes 7 is positioned outside the signal electrode 6 but separated in the plane view from the signal electrode 6 at a distance or gap in the range of 5–200 micrometers. The distance of the two ground electrodes 7 from the signal electrode 6 is determined so that a ratio of the width of the signal electrode 6 to the distance is in the range of 1–0.1, wherein the width of the signal electrode 6 is in the range of 5–20 micrometers as described above.

The ground electrode 7 has a width in the range of 100–9000 micrometers, a length in the range of 10–70 millimeters and a thickness in the range of 3–40 micrometers.

Optical fiber packages 14 and optical fibers are provided at opposite end portions of the titanium-diffused optical waveguide so that the Y-shaped optical divider portion 2 and the Y-shaped optical coupler portion 3 are coupled via the optical fiber packages 9 to the optical fibers.

The signal electrode 6 has opposite ends which are connected with strip line pads 8. Another substrate 13 is formed adjacent to the substrate 1 so that the boundary between the substrate 1 and the other substrate 13 is positioned adjacent to or in plane view corresponding to edges of the strip line pads 8 connected with the signal electrode 6. The other substrate 13 has a top surface which has a higher level than the top surface of the substrate 1 by the thickness of the dielectric buffer layer 5 as well illustrated in FIG. 10A. As illustrated in FIG. 10B, the dielectric buffer layer 5 is therefore provided over the substrate 1 except over the other substrate 13. The top surface of the other substrate 13 has the same level as the top surface of the dielectric buffer layer 5 as well illustrated in FIG. 10A. The ground electrode 7 both extends over the dielectric buffer layer 5 extending over the substrate 1 and extends over the other substrate 13, whilst the signal electrode 6 and the strip line pads 8 extends over the dielectric buffer layer 5 extending over the substrate 1 but do not extend over the other substrate 13. The other substrate 13 may be made of ceramic, glass, silicon or other semiconductors or insulative materials. Recesses 11 are selectively formed in the upper region of the other substrate 13 so that the recesses 11 are positioned adjacent to the strip line pads 8 connected with the signal electrode 6. The bottom of the recesses 11 has a lower level than the top surface of the substrate 1 as well illustrated in FIG. 10B. The shape of the recesses 11 is decided in accordance with the size and shape of connectors 9 so that the connectors 9 are received securely in the recesses 11. The size of the recesses 11 has a length in the range of 0.2–2 mm, a depth in the range of 0.1–0.5 mm and a width in the range of 0.1–0.6 mm. The recesses 11 may, for example, comprise a V-shaped groove, a rectangle-shaped slit and a cyrindrically shaped slit so as to adjust commercially available various connectors such as OCM-connector, OSSM-connector, K-connector, V-connector. The connectors 9 are attached to connector packages or mounts 10. The connectors 9 attached to connector packages or mounts 10 are then put in the recesses 11 so that the connectors 9 are made adjacent to or into contact with the strip line pads 8 and that the top of the connectors 9 has the same level as the top of the signal electrode 6 as illustrated in FIG. 10B. If the connectors 9 are provided adjacent to the strip line pads 8, the connectors 9 are electrically connected to the strip line pads 8 through connecting members 12 such as Au ribbons, wiring or strips. If, however, the connectors 9 are provided in directly contact with the strip line pads 8.

A microwave is applied through the connector 9 to the strip line pad 8 which is connected with the signal electrode 6. As described above, the majority of the microwave is propagated on the surface region of the conductors, for example, the connector 9 and the signal electrode 6. Namely, the majority of the microwave is propagated on the top surface regions of the connector 9 and the signal electrode 6. However, the top of the connectors 9 has the same level as the top of the signal electrode 6 and the connecting members 12 such as Au ribbons, wiring or strips are provided to connect the surface regions of the connector 9 and the strip line pads 8 as illustrated in FIG. 10B. If the connectors 9 are electrically connected to the strip line pads 8 through the connecting members 12 such as Au ribbons, wiring or strips, the majority of the microwave can travel from the surface region of the connector 9 through the connecting members 12 to the surface region of the strip line pad 8 without any substantial loss. If, however, the connectors 9 are directly contact with the strip line pads 8 so that the top surface of the connectors 9 have the same level as the strip line pads 8, then the majority of the microwave can travel from the surface regions of the connectors 9 to the surface regions of the strip line pads 8 without any substantial loss. In either case, the majority of the microwave can travel from the connector 9 through the strip line pads 8 to the signal electrode 6 without any substantial loss. This connector structure suppresses the increase in the microwave attenuation or allows a considerable reduction in the microwave attenuation.

Third Embodiment

Figure 11:
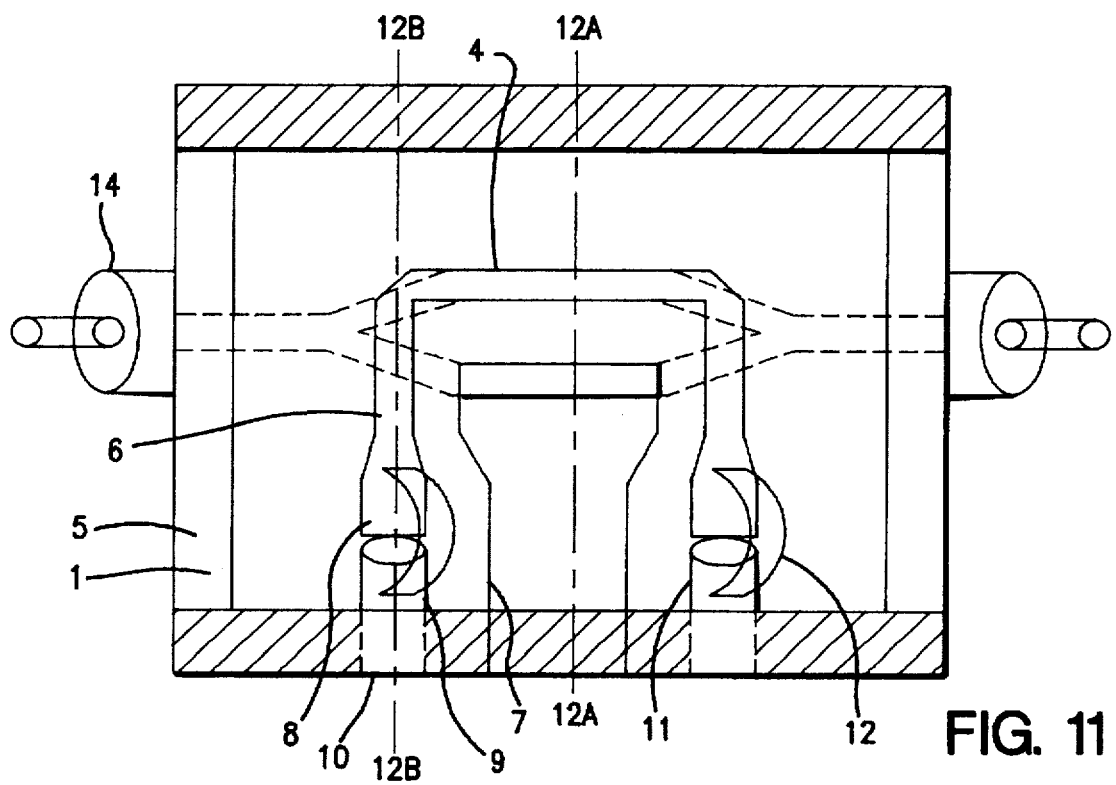
FIG. 11 is a plane view illustrative of a novel Mach-Zehnder optical modulator including an improved connector package in a third embodiment in accordance with the present invention.
Figure 12A:
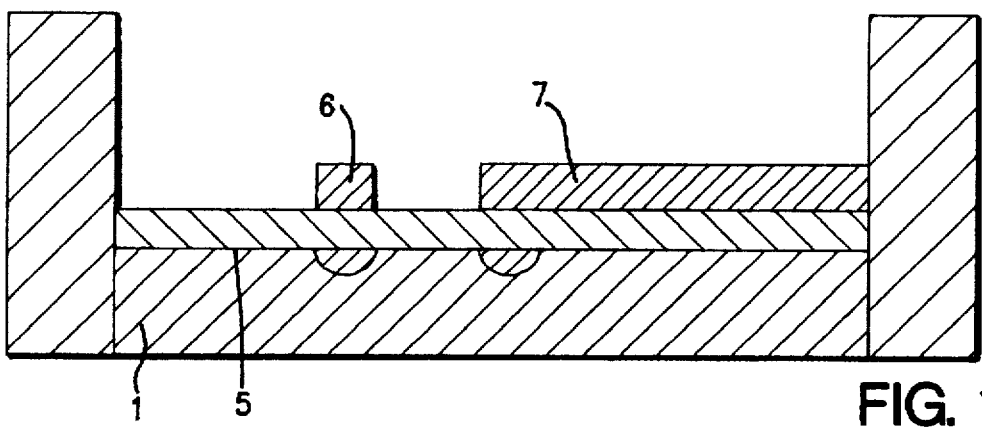
FIG. 12A is a cross sectional elevation view illustrative of a novel Mach-Zehnder optical modulator taken along an A-B line in FIG. 11 in a third embodiment in accordance with the present invention.
Figure 12B:
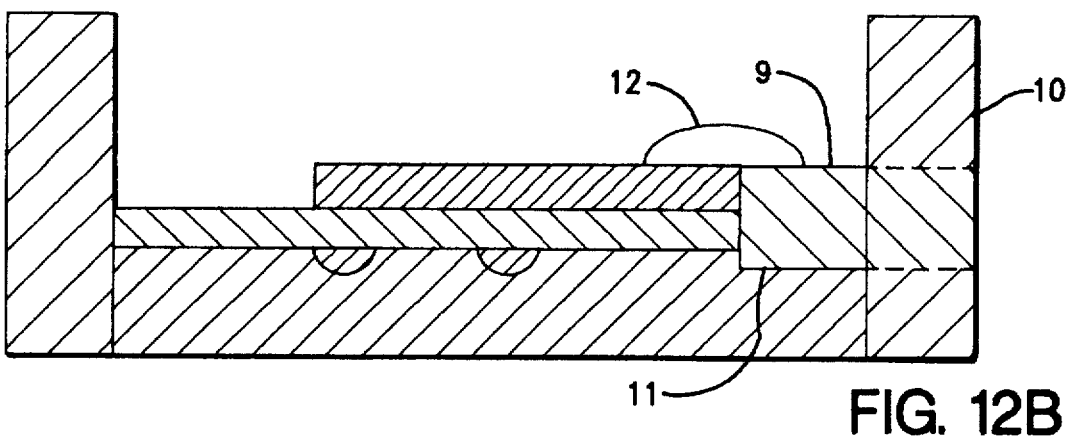
FIG. 12B is a cross sectional elevation view illustrative of a novel Mach-Zehnder optical modulator taken along a C-D line in FIG. 11 in a third embodiment in accordance with the present invention.

A third embodiment according to the present invention will be described in detail with reference to FIGS. 11, 12A and 12B. FIG. 11 is a plane view illustrative of a novel Mach-Zehnder optical modulator including an improved connector package in a third embodiment in accordance with the present invention. FIG. 12A is a cross sectional elevation view illustrative of a novel Mach-Zehnder optical modulator taken along an A-B line in FIG. 11 in a third embodiment in accordance with the present invention. FIG. 12B is a cross sectional elevation view illustrative of a novel Mach-Zehnder optical modulator taken along a C-D line in FIG. 11 in a third embodiment in accordance with the present invention.

A crystal substrate 1, for example, a LiNbO$_3$ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5-20 micrometers and a thickness of 500-1200 angstroms. The crystal substrate 1 was then subjected to a heat treatment at a temperature in the range of 900° C. to 1000° C. for 5-12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. The top surface of the titanium-diffused optical waveguide has the same level as the top surface of the crystal substrate 1 to form a flat surface. A dielectric buffer layer 5, for example, SiO$_2$ buffer layer is provided entirely on the flat surface so that the dielectric buffer layer 5 extends over the optical waveguide and the crystal substrate 1. The dielectric buffer layer 5 varies in thickness in the range of 1-10 micrometers. The dielectric buffer layer 5 has a dielectric constant in the range of 1.1-40.

In this embodiment, an asymmetric coplanar strip type electrode structure is selectively provided on the dielectric buffer layer 5, although other electrodes structures may be provided such as asymmetric strip line type electrode structure. The asymmetric coplanar strip type electrode structure comprises a signal electrode 6 and a ground electrode 7.

Here, a first one of the two straight arm optical modulator portions 4 is defined as having a larger value on the X-coordinate, while a second one of the two straight arm optical modulator portions 4 is defined as having a smaller value on the X-coordinate.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5-20 micrometers and a length in the range of 10-70 millimeters as well as a thickness of 3-40 micrometers.

The ground electrode 7 extends over the dielectric buffer layer 5 over the second one of the two straight arm optical modulator portions 4 so that the ground electrode 7 entirely covers in the plane view the second one of the two straight arm optical modulator portions 4. The ground electrode 7 further extends over the dielectric buffer layer 5 over the crystal substrate 1 on lower regions on the X-coordinate than and outside the second one of the two straight arm optical modulator portions 4. The ground electrode 7 is separated in the plane view from the signal electrode 6 at a distance or gap in the range of 5-200 micrometers. The ground electrode 7 has a width in the range of 100-9000 micrometers, a length in the range of 10-70 millimeters and a thickness in the range of 3-40 micrometers.

Optical fiber packages 14 and optical fibers are provided at opposite end portions of the titanium-diffused optical waveguide so that the Y-shaped optical divider portion 2 and the Y-shaped optical coupler portion 3 are coupled via the optical fiber packages 9 to the optical fibers.

The signal electrode 6 has opposite ends which are connected with strip line pads 8. Recesses 11 are selectively formed in the upper region of the substrate 1 so that the recesses 11 are positioned adjacent to the strip line pads 8 connected with the signal electrode 6. As well illustrated in FIG. 12B, the dielectric buffer layer 5 is provided except over the recesses formed in the upper region of the substrate 1. The signal electrode 6 is also formed except over the recesses formed in the upper region of the substrate 1. Namely, laminations of the dielectric buffer layer 5 and the signal electrode 6 are not formed over the recesses 11. The shape of the recesses 11 is decided in accordance with the size and shape of connectors 9 so that the connectors 9 are received securely in the recesses 11. The size of the recesses 11 has a length in the range of 0.2-2 mm, a depth in the range of 0.1-0.5 mm and a width in the range of 0.1-0.6 mm. The recesses 11 may, for example, comprise a V-shaped groove, a rectangle-shaped slit and a cyrindrically shaped slit so as to adjust commercially available various connectors such as OCM-connector, OSSM-connector, K-connector, V-connector. The connectors 9 are attached to connector packages or mounts 10. The connectors 9 attached to connector packages or mounts 10 are then put in the recesses 11 so that the connectors 9 are made adjacent to or into contact with the strip line pads 8 and that the top of the connectors 9 has the same level as the top of the signal electrode 6 as illustrated in FIG. 12B. If the connectors 9 are provided adjacent to the strip line pads 8, the connectors 9 are electrically connected to the strip line pads 8 through connecting members 12 such as Au ribbons, wiring or strips. If, however, the connectors 9 are provided in directly contact with the strip line pads 8.

A microwave is applied through the connector 9 to the strip line pad 8 which is connected with the signal electrode 6. As described above, the majority of the microwave is propagated on the surface region of the conductors, for example, the connector 9 and the signal electrode 6. Namely, the majority of the microwave is propagated on the top surface regions of the connector 9 and the signal electrode 6. However, the top of the connectors 9 has the same level as the top of the signal electrode 6 and the connecting members 12 such as Au ribbons, wiring or strips are provided to connect the surface regions of the connector 9 and the strip line pads 8 as illustrated in FIG. 12B. If the connectors 9 are electrically connected to the strip line pads 8 through the connecting members 12 such as Au ribbons, wiring or strips, the majority of the microwave can travel from the surface region of the connector 9 through the connecting members 12 to the surface region of the strip line pad 8 without any substantial loss. If, however, the connectors 9 are directly contact with the strip line pads 8 so that the top surface of the connectors 9 have the same level as the strip line pads 8, then the majority of the microwave can travel from the surface regions of the connectors 9 to the surface regions of the strip line pads 8 without any substantial loss. In either case, the majority of the microwave can travel from the connector 9 through the strip line pads 8 to the signal electrode 6 without any substantial loss. This connector structure suppresses the increase in the microwave attenuation or allows a considerable reduction in the microwave attenuation.

Fourth Embodiment

Figure 13:
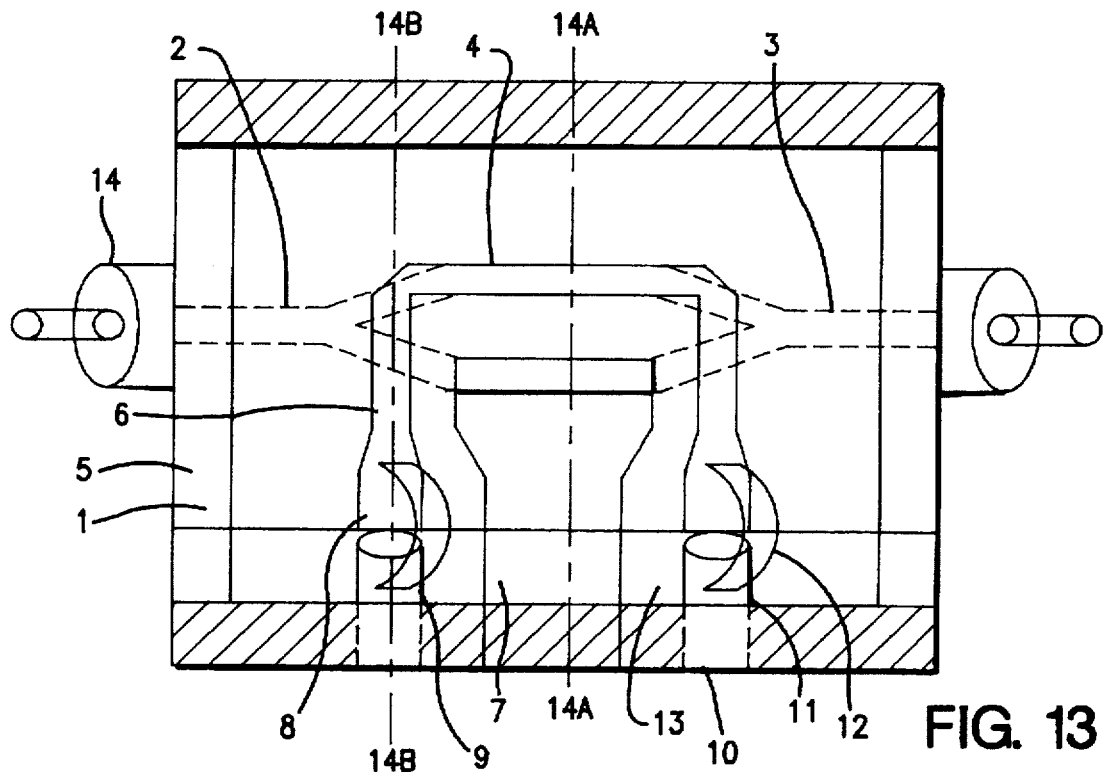
FIG. 13 is a plane view illustrative of a novel Mach-Zehnder optical modulator including an improved dielectric buffer layer which varies in thickness in a fourth embodiment in accordance with the present invention.
Figure 14A:
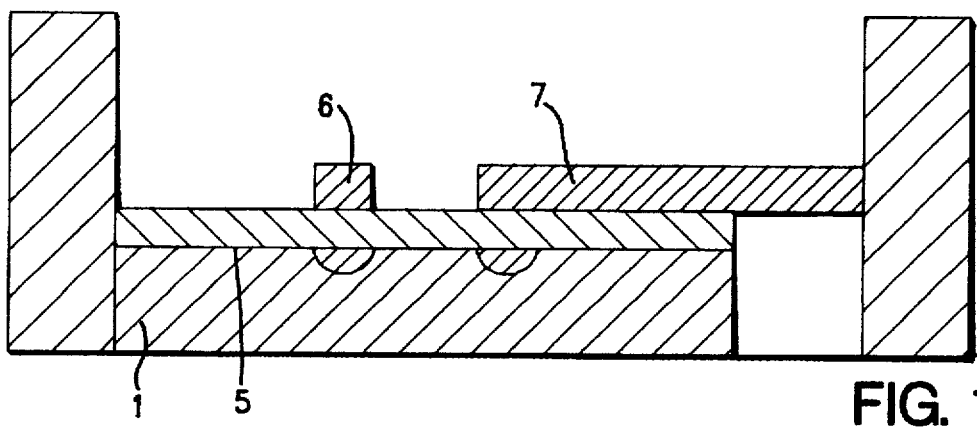
FIG. 14A is a cross sectional elevation view illustrative of a novel Mach-Zehnder optical modulator taken along an A-B line in FIG. 13 in a fourth embodiment in accordance with the present invention.
Figure 14B:
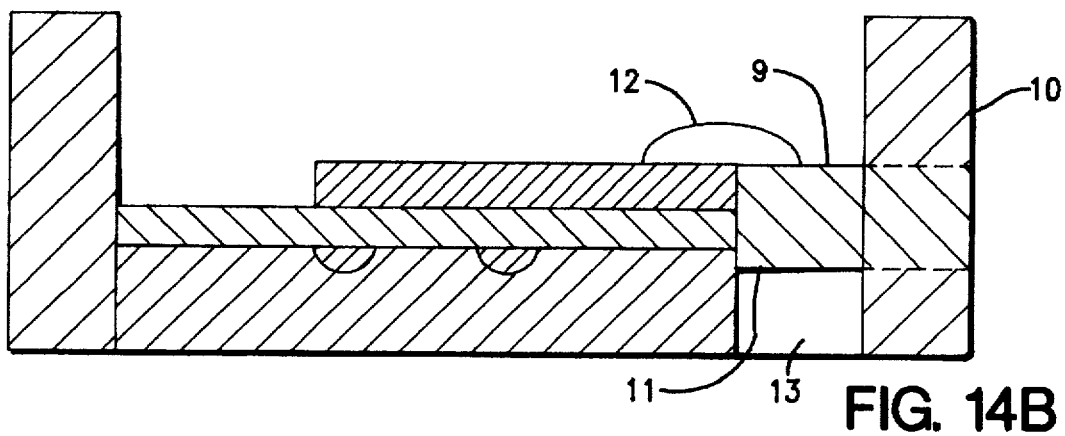
FIG. 14B is a cross sectional elevation view illustrative of a novel Mach-Zehnder optical modulator taken along a C-D line in FIG. 13 in a fourth embodiment in accordance with the present invention.

A fourth embodiment according to the present invention will be described in detail with reference to FIGS. 13, 14A and 14B. FIG. 13 is a plane view illustrative of a novel Mach-Zehnder optical modulator including an improved connector package in a fourth embodiment in accordance with the present invention. FIG. 14A is a cross sectional elevation view illustrative of a novel Mach-Zehnder optical modulator taken along an A-B line in FIG. 13 in a fourth embodiment in accordance with the present invention. FIG. 14B is a cross sectional elevation view illustrative of a novel Mach-Zehnder optical modulator taken along a C-D line in FIG. 13 in a fourth embodiment in accordance with the present invention.

A crystal substrate 1, for example, a LiNbO$_3$ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5-20 micrometers and a thickness of 500-1200 angstroms. The crystal substrate 1 was then subjected to a heat treatment at a temperature in the range of 900° C. to 1000° C. for 5-12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. The top surface of the titanium-diffused optical waveguide has the same level as the top surface of the crystal substrate 1 to form a flat surface. A dielectric buffer layer 5, for example, SiO$_2$ buffer layer is provided entirely on the flat surface so that the dielectric buffer layer 5 extends over the optical waveguide and the crystal substrate 1. The dielectric buffer layer 5 varies in thickness in the range of 1-10 micrometers. The dielectric buffer layer 5 has a dielectric constant in the range of 1.1-40.

In this embodiment, an asymmetric coplanar strip type electrode structure is selectively provided on the dielectric buffer layer 5, although other electrodes structures may be provided such as asymmetric strip line type electrode structure. The asymmetric coplanar strip type electrode structure comprises a signal electrode 6 and a ground electrode 7.

Here, a first one of the two straight arm optical modulator portions 4 is defined as having a larger value on the X-coordinate, while a second one of the two straight arm optical modulator portions 4 is defined as having a smaller value on the X-coordinate.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5-20 micrometers and a length in the range of 10-70 millimeters as well as a thickness of 3-40 micrometers.

The ground electrode 7 extends over the dielectric buffer layer 5 over the second one of the two straight arm optical modulator portions 4 so that the ground electrode 7 entirely covers in the plane view the second one of the two straight arm optical modulator portions 4. The ground electrode 7 further extends over the dielectric buffer layer 5 over the crystal substrate 1 on lower regions on the X-coordinate than and outside the second one of the two straight arm optical modulator portions 4. The ground electrode 7 is separated in the plane view from the signal electrode 6 at a distance or gap in the range of 5-200 micrometers. The ground electrode 7 has a width in the range of 100-9000 micrometers, a length in the range of 10-70 millimeters and a thickness in the range of 3-40 micrometers.

Optical fiber packages 14 and optical fibers are provided at opposite end portions of the titanium-diffused optical waveguide so that the Y-shaped optical divider portion 2 and the Y-shaped optical coupler portion 3 are coupled via the optical fiber packages 9 to the optical fibers.

The signal electrode 6 has opposite ends which are connected with strip line pads 8. Another substrate 13 is formed adjacent to the substrate 1 so that the boundary between the substrate 1 and the other substrate 13 is positioned adjacent to or in plane view corresponding to edges of the strip line pads 8 connected with the signal electrode 6. The other substrate 13 has a top surface which has a higher level than the top surface of the substrate 1 by the thickness of the dielectric buffer layer 5 as well illustrated in FIG. 14A. As illustrated in FIG. 14B, the dielectric buffer layer 5 is therefore provided over the substrate 1 except over the other substrate 13. The top surface of the other substrate 13 has the same level as the top surface of the dielectric buffer layer 5 as well illustrated in FIG. 14A. The ground electrode 7 both extends over the dielectric buffer layer 5 extending over the substrate 1 and extends over the other substrate 13, whilst the signal electrode 6 and the strip line pads 8 extends over the dielectric buffer layer 5 extending over the substrate 1 but do not extend over the other substrate 13. The other substrate 13 may be made of ceramic, glass, silicon or other semiconductors or insulative materials. Recesses 11 are selectively formed in the upper region of the other substrate 13 so that the recesses 11 are positioned adjacent to the strip line pads 8 connected with the signal electrode 6. The bottom of the recesses 11 has a lower level than the top surface of the substrate 1 as well illustrated in FIG. 14B. The shape of the recesses 11 is decided in accordance with the size and shape of connectors 9 so that the connectors 9 are received securely in the recesses 11. The size of the recesses L1 has a length in the range of 0.2–2 mm, a depth in the range of 0.1–0.5 mm and a width in the range of 0.1–0.6 mm. The recesses 11 may, for example, comprise a V-shaped groove, a rectangle-shaped slit and a cyrindrically shaped slit so as to adjust commercially available various connectors such as OCM-connector, OSSM-connector, K-connector, V-connector. The connectors 9 are attached to connector packages or mounts 10. The connectors 9 attached to connector packages or mounts 10 are then put in the recesses 11 so that the connectors 9 are made adjacent to or into contact with the strip line pads 8 and that the top of the connectors 9 has the same level as the top of the signal electrode 6 as illustrated in FIG. 14B. If the connectors 9 are provided adjacent to the strip line pads 8, the connectors 9 are electrically connected to the strip line pads 8 through connecting members 12 such as Au ribbons, wiring or strips. If, however, the connectors 9 are provided in directly contact with the strip line pads 8.

A microwave is applied through the connector 9 to the strip line pad 8 which is connected with the signal electrode 6. As described above, the majority of the microwave is propagated on the surface region of the conductors, for example, the connector 9 and the signal electrode 6. Namely, the majority of the microwave is propagated on the top surface regions of the connector 9 and the signal electrode 6. However, the top of the connectors 9 has the same level as the top of the signal electrode 6 and the connecting members 12 such as Au ribbons, wiring or strips are provided to connect the surface regions of the connector 9 and the strip line pads 8 as illustrated in FIG. 14B. If the connectors 9 are electrically connected to the strip line pads 8 through the connecting members 12 such as Au ribbons, wiring or strips, the majority of the microwave can travel from the surface region of the connector 9 through the connecting members 12 to the surface region of the strip line pad 8 without any substantial loss. If, however, the connectors 9 are directly contact with the strip line pads 8 so that the top surface of the connectors 9 have the same level as the strip line pads 8, then the majority of the microwave can travel from the surface regions of the connectors 9 to the surface regions of the strip line pads 8 without any substantial loss. In either case, the majority of the microwave can travel from the connector 9 through the strip line pads 8 to the signal electrode 6 without any substantial loss. This connector structure suppresses the increase in the microwave attenuation or allows a considerable reduction in the microwave attenuation.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims any modifications of the present invention which fall within the spirit and scope of the present invention.

What is claimed is:

1. A connector for connecting to a pad of a signal electrode selectively formed over a dielectric buffer layer which extends over a crystal substrate of an optical device,
   wherein a recess is selectively formed in an upper region of said crystal substrate so that said recess is positioned in the vicinity of said pad, and
   wherein said dielectric buffer layer and said signal electrode are not formed over said recess so that said connector is received securely in said recess whereby a side face of said connector is made into directly contact with a side face of said pad, and a top of said connector has substantially the same level as a top of said pad to allow a majority of microwave energy to travel between top surface regions of said pad and said connector without substantial loss.

2. The connector structure as claimed in claim 1, further comprising an electrically conductive connection member which connects between top surfaces of said pad and said connector so as to allow microwave energy to travel between top surface regions of said pad and said connector not only directly to each other but also through said electrically conductive connection member.

3. The connector structure as claimed in claim 2, wherein said electrically conductive connection member comprises an Au ribbon.

4. The connector structure as claimed in claim 2, wherein said electrically conductive connection member comprises wiring.

5. The connector structure as claimed in claim 2, wherein said electrically conductive connection member comprises a strip.

6. A connector for connecting to a pad of a signal electrode selectively formed over a dielectric buffer layer which extends over a crystal substrate of an optical device,
   wherein a recess is selectively formed in an upper region of said crystal substrate so that said recess is positioned in the vicinity of said pad, and
   wherein said dielectric buffer layer and said signal electrode are not formed over said recess so that said connector is received securely in said recess whereby a side face of said connector is made adjacent to a side face of said pad, and an electrically conductive connection member is provided to connect between top surfaces of said pad and said connector so as to allow microwave energy to travel between top surface regions of said pad and said connector through said electrically conductive connection member.

7. The connector structure as claimed in claim 6, wherein a top of said connector has substantially the same level as a top of said pad.

8. The connector structure as claimed in claim 6, wherein said electrically conductive connection member comprises an Au ribbon.

9. The connector structure as claimed in claim 6, wherein said electrically conductive connection member comprises wiring.

10. The connector structure as claimed in claim 6, wherein said electrically conductive connection member comprises a strip.

11. A connector for connecting to a pad of a signal electrode selectively formed over a dielectric buffer layer which extends over a crystal substrate of an optical device, said crystal substrate being in directly contact with a secondary substrate, a top surface of said secondary substrate having a higher level by a thickness of said dielectric buffer layer than a top surface of said crystal substrate so that said dielectric buffer layer does not extend over said secondary substrate and that the top surface of said secondary substrate has substantially the same level as a top surface of said dielectric buffer layer,
   wherein a recess is selectively formed in an upper region of said secondary substrate so that said recess is positioned in the vicinity of said pad, and
   wherein said dielectric buffer layer and said signal electrode are not formed over said recess so that said connector is received securely in said recess whereby a side face of said connector is made into directly contact with a side face of said pad, and a top of said connector has substantially the same level as a top of said pad to allow a majority of microwave energy to travel between top surface regions of said pad and said connector without substantial loss.

12. The connector structure as claimed in claim 11, further comprising an electrically conductive connection member which connects between top surfaces of said pad and said connector so as to allow microwave energy to travel between top surface regions of said pad and said connector not only directly to each other but also through said electrically conductive connection member.

13. The connector structure as claimed in claim 12, wherein said electrically conductive connection member comprises an Au ribbon.

14. The connector structure as claimed in claim 12, wherein said electrically conductive connection member comprises wiring.

15. The connector structure as claimed in claim 12, wherein said electrically conductive connection member comprises a strip.

16. A connector for connecting to a pad of a signal electrode selectively formed over a dielectric buffer layer which extends over a crystal substrate of an optical device, said crystal substrate being in directly contact with a secondary substrate, a top surface of said secondary substrate having a higher level by a thickness of said dielectric buffer layer than a top surface of said crystal substrate so that said dielectric buffer layer does not extend over said secondary substrate and that the top surface of said secondary substrate has substantially the same level as a top surface of said dielectric buffer layer,
wherein a recess is selectively formed in an upper region of said secondary substrate so that said recess is positioned in the vicinity of said pad, and
wherein said dielectric buffer layer and said signal electrode are not formed over said recess so that said connector is received securely in said recess whereby a side face of said connector is made adjacent to a side face of said pad, and an electrically conductive connection member is provided to connect between top surfaces of said pad and said connector so as to allow microwave energy to travel between top surface regions of said pad and said connector through said electrically conductive connection member.

17. The connector structure as claimed in claim 16, wherein a top of said connector has substantially the same level as a top of said pad.

18. The connector structure as claimed in claim 16, wherein said electrically conductive connection member comprises an Au ribbon.

19. The connector structure as claimed in claim 16, wherein said electrically conductive connection member comprises wiring.

20. The connector structure as claimed in claim 16, wherein said electrically conductive connection member comprises a strip.

21. An optical device comprising:
a crystal substrate provided with at least an optical waveguide;
a dielectric buffer layer extending over said crystal substrate and said optical waveguide;
at least a signal electrode selectively provided on said dielectric buffer layer for applying an electric field through at least a part of said dielectric buffer layer to at least a part of said optical waveguide for causing said at least part of said optical waveguide to vary in refractive index profile in linear-proportion to an intensity of said electric field thereby causing a phase shift of a light which is on propagation in said at least part of said optical waveguide; and
at least a pad connected with an end of said signal electrode, said pad being also selectively formed over said dielectric buffer layer,
wherein a recess is selectively formed in an upper region of said crystal substrate so that said recess is positioned in the vicinity of said pad, and
wherein said dielectric buffer layer and said signal electrode are not formed over said recess so that said connector is received securely in said recess whereby a side face of said connector is made into directly contact with a side face of said pad, and a top of said connector has substantially the same level as a top of said pad to allow a majority of microwave energy to travel between top surface regions of said pad and said connector without substantial loss.

22. The optical device as claimed in claim 21, further comprising an electrically conductive connection member which connects between top surfaces of said pad and said connector so as to allow microwave energy to travel between top surface regions of said pad and said connector not only directly to each other but also through said electrically conductive connection member.

23. The optical device as claimed in claim 22, wherein said electrically conductive connection member comprises an Au ribbon.

24. The optical device as claimed in claim 22, wherein said electrically conductive connection member comprises wiring.

25. The optical device as claimed in claim 22, wherein said electrically conductive connection member comprises a strip.

26. An optical device comprising:
a crystal substrate provided with at least an optical waveguide;
a dielectric buffer layer extending over said crystal substrate and said optical waveguide;
at least a signal electrode selectively provided on said dielectric buffer layer for applying an electric field through at least a part of said dielectric buffer layer to at least a part of said optical waveguide for causing said at least part of said optical waveguide to vary in refractive index profile in linear-proportion to an intensity of said electric field thereby causing a phase shift of a light which is on propagation in said at least part of said optical waveguide; and
at least a pad connected with an end of said signal electrode, said pad being also selectively formed over said dielectric buffer layer,
wherein a recess is selectively formed in an upper region of said crystal substrate so that said recess is positioned in the vicinity of said pad, and
wherein said dielectric buffer layer and said signal electrode are not formed over said recess so that said connector is received securely in said recess whereby a side face of said connector is made adjacent to a side face of said pad, and an electrically conductive connection member is provided to connect between top surfaces of said pad and said connector so as to allow microwave energy to travel between top surface regions of said pad and said connector through said electrically conductive connection member.

27. The optical device as claimed in claim 26, wherein a top of said connector has substantially the same level as a top of said pad.

28. The optical device as claimed in claim 26, wherein said electrically conductive connection member comprises an Au ribbon.

29. The optical device as claimed in claim 26, wherein said electrically conductive connection member comprises wiring.

30. The optical device as claimed in claim 26, wherein said electrically conductive connection member comprises a strip.

31. An optical device comprising:
a crystal substrate provided with at least an optical waveguide;
a dielectric buffer layer extending over said crystal substrate and said optical waveguide;
at least a signal electrode selectively provided on said dielectric buffer layer for applying an electric field through at least a part of said dielectric buffer layer to at least a part of said optical waveguide for causing said at least part of said optical waveguide to vary in refractive index profile in linear-proportion to an intensity of said electric field thereby causing a phase shift of a light which is on propagation in said at least part of said optical waveguide;
at least a pad connected with an end of said signal electrode, said pad being also selectively formed over said dielectric buffer layer; and
a secondary substrate being indirectly contact with said crystal substrate, a top surface of said secondary substrate having a higher level by a thickness of said dielectric buffer layer than a top surface of said crystal substrate so that said dielectric buffer layer does not extend over said secondary substrate and that the top surface of said secondary substrate has substantially the same level as a top surface of said dielectric buffer layer,
wherein a recess is selectively formed in an upper region of said secondary substrate so that said recess is positioned in the vicinity of said pad, and
wherein said dielectric buffer layer and said signal electrode are not formed over said recess so that said connector is received securely in said recess whereby a side face of said connector is made into directly contact with a side face of said pad, and a top of said connector has substantially the same level as a top of said pad to allow a majority of microwave energy to travel between top surface regions of said pad and said connector without substantial loss.

32. The optical device as claimed in claim 31, further comprising an electrically conductive connection member which connects between top surfaces of said pad and said connector so as to allow microwave energy to travel between top surface regions of said pad and said connector not only directly to each other but also through said electrically conductive connection member.

33. The optical device as claimed in claim 32, wherein said electrically conductive connection member comprises an Au ribbon.

34. The optical device as claimed in claim 32, wherein said electrically conductive connection member comprises wiring.

35. The optical device as claimed in claim 32, wherein said electrically conductive connection member comprises a strip.

36. An optical device comprising:
a crystal substrate provided with at least an optical waveguide;
a dielectric buffer layer extending over said crystal substrate and said optical waveguide;
at least a signal electrode selectively provided on said dielectric buffer layer for applying an electric field through at least a part of said dielectric buffer layer to at least a part of said optical waveguide for causing said at least part of said optical waveguide to vary in refractive index profile in linear-proportion to an intensity of said electric field thereby causing a phase shift of a light which is on propagation in said at least part of said optical waveguide;
at least a pad connected with an end of said signal electrode, said pad being also selectively formed over said dielectric buffer layer; and
a secondary substrate being in directly contact with said crystal substrate, a top surface of said secondary substrate having a higher level by a thickness of said dielectric buffer layer than a top surface of said crystal substrate so that said dielectric buffer layer does not extend over said secondary substrate and that the top surface of said secondary substrate has substantially the same level as a top surface of said dielectric buffer layer,
wherein a recess is selectively formed in an upper region of said secondary substrate so that said recess is positioned in the vicinity of said pad, and
wherein said dielectric buffer layer and said signal electrode are not formed over said recess so that said connector is received securely in said recess whereby a side face of said connector is made adjacent to a side face of said pad, and an electrically conductive connection member is provided to connect between top surfaces of said pad and said connector so as to allow microwave energy to travel between top surface regions of said pad and said connector through said electrically conductive connection member.

37. The optical device as claimed in claim 36, wherein a top of said connector has substantially the same level as a top of said pad.

38. The optical device as claimed in claim 36, wherein said electrically conductive connection member comprises an Au ribbon.

39. The optical device as claimed in claim 36, wherein said electrically conductive connection member comprises wiring.

40. The optical device as claimed in claim 36, wherein said electrically conductive connection member comprises a strip.

41. A Mach-Zehnder optical modulator comprising:
a crystal substrate capable of causing an electro-optical effect, said crystal substrate comprising an active region, a first passive region in directly contact with a first side of said active region and a second passive region in directly contact with a second side opposite to said first side of said active region;
an optical waveguide extending over said active region and said first and second passive regions of said crystal substrate, said optical waveguide comprising a Y-shaped optical divider portion provided on said first passive region, first and second straight arm portions provided in parallel to each other on said active region and coupled to said Y-shaped optical divider portion, and a Y-shaped optical coupler portion provided on said second passive region and coupled to said first and second straight arm portions, and a top surface of said optical waveguide and a surface of said crystal substrate forming a flat surface;

a dielectric buffer layer extending over said flat surface;

a signal electrode selectively provided on said buffer layer over said first straight arm portion for applying an electric field through said dielectric layer to said first straight arm portion for causing said first straight arm portion to vary in refractive index profile in linear-proportion to an intensity of said electric field thereby causing phase shift of a light which is on propagation in said first straight arm portion;

a ground electrode selectively provided on said buffer layer over said second straight arm portion; and at least a pad connected with an end of said signal electrode, said pad being also selectively formed over said dielectric buffer layer.

wherein a recess is selectively formed in an upper region of said crystal substrate so that said recess is positioned in the vicinity of said pad, and wherein aid dielectric buffer layer and said signal electrode are not formed over said recess so that said connector is received securely in said recess whereby a side face of said connector is made into directly contact with a side face of said pad, and a top of said connector has substantially the same level as a top of said pad to allow a majority of microwave energy to travel between top surface regions of said pad and said connector without substantial loss.

42. The Mach-Zehnder optical modulator as claimed in claim 41, further comprising an electrically conductive connection member which connects between top surfaces of said pad and said connector so as to allow microwave energy to travel between top surface regions of said pad and said connector not only directly to each other but also through said electrically conductive connection member.

43. The Mach-Zehnder optical modulator as claimed in claim 42, wherein said electrically conductive connection member comprises an Au ribbon.

44. The Mach-Zehnder optical modulator as claimed in claim 42, wherein said electrically conductive connection member comprises wiring.

45. The Mach-Zehnder optical modulator as claimed in claim 42, wherein said electrically conductive connection member comprises a strip.

46. A Mach-Zehnder optical modulator comprising:

a crystal substrate capable of causing an electro-optical effect, said crystal substrate comprising an active region, a first passive region in directly contact with a first side of said active region and a second passive region in directly contact with a second side opposite to said first side of said active region;

an optical waveguide extending over said active region and said first and second passive regions of said crystal substrate, said optical waveguide comprising a Y-shaped optical divider portion provided on said first passive region, first and second straight arm portions provided in parallel to each other on said active region and coupled to said Y-shaped optical divider portion, and a Y-shaped optical coupler portion provided on said second passive region and coupled to said first and second straight arm portions, and a top surface of said optical waveguide and a surface of said crystal substrate forming a flat surface;

a dielectric buffer layer extending over said flat surface;

a signal electrode selectively provided on said buffer layer over said first straight arm portion for applying an electric field through said dielectric layer to said first straight arm portion for causing said first straight arm portion to vary in refractive index profile in linear-proportion to an intensity of said electric field thereby causing phase shift of a light which is on propagation in said first straight arm portion;

a ground electrode selectively provided on said buffer layer over said second straight arm portion;

at least a pad connected with an end of said signal electrode, said pad being also selectively formed over said dielectric buffer layer.

wherein a recess is selectively formed in an upper region of said crystal substrate so that said recess is positioned in the vicinity of said pad, and wherein said dielectric buffer layer and said signal electrode are not formed over said recess so that said connector is received securely in said recess whereby a side face of said connector is made adjacent to a side face of said pad, and an electrically conductive connection member is provided to connect between top surfaces of said pad and said connector so as to allow microwave energy to travel between top surface regions of said pad and said connector through said electrically conductive connection member.

47. The Mach-Zehnder optical modulator as claimed in claim 46, wherein a top of said connector has substantially the same level as a top of said pad.

48. The Mach-Zehnder optical modulator as claimed in claim 46, wherein said electrically conductive connection member comprises an Au ribbon.

49. The Mach-Zehnder optical modulator as claimed in claim 46, wherein said electrically conductive connection member comprises wiring.

50. The Mach-Zehnder optical modulator as claimed in claim 46, wherein said electrically conductive connection member comprises a strip.

51. A Mach-Zehnder optical modulator comprising:

a crystal substrate capable of causing an electro-optical effect, said crystal substrate comprising an active region, a first passive region in directly contact with a first side of said active region and a second passive region in directly contact with a second side opposite to said first side of said active region;

an optical waveguide extending over said active region and said first and second passive regions of said crystal substrate, said optical waveguide comprising a Y-shaped optical divider portion provided on said first passive region, first and second straight arm portions provided in parallel to each other on said active region and coupled to said Y-shaped optical divider portion, and a Y-shaped optical coupler portion provided on said second passive region and coupled to said first and second straight arm portions, and a top surface of said optical waveguide and a surface of said crystal substrate forming a flat surface;

a dielectric buffer layer extending over said flat surface;

a signal electrode selectively provided on said buffer layer over said first straight arm portion for applying an electric field through said dielectric layer to said first straight arm portion for causing said first straight arm portion to vary in refractive index profile in linear-proportion to an intensity of said electric field thereby causing phase shift of a light which is on propagation in said first straight arm portion;

a ground electrode selectively provide on said buffer layer over said second straight arm portion;

at least a pad connected with an end of said signal electrode, said pad being also selectively formed over said dielectric buffer layer; and a secondary substrate being in directly contact with said crystal substrate, a top surface of said secondary substrate having a higher level by a thickness of said dielectric buffer layer than a top surface of said crystal substrate so that said dielectric buffer layer does not extend over said secondary substrate and that the top surface of said secondary substrate has substantially the same level as a top surface of said dielectric buffer layer, wherein a recess is selectively formed in an upper region of said secondary substrate so that said recess is positioned in the vicinity of said pad, and wherein said dielectric buffer layer and said signal electrode are not formed over said recess so that said connector is received securely in said recess whereby a side face of said connector is made into directly contact with a side face of said pad, and a top of said connector has substantially the same level as a top of said pad to allow a majority of microwave energy to travel between top surface regions of said pad and said connector without substantial loss.

52. The Mach-Zehnder optical modulator as claimed in claim 51, further comprising an electrically conductive connection member which connects between top surfaces of said pad and said connector so as to allow microwave energy to travel between top surface regions of said pad and said connector not only directly to each other but also through said electrically conductive connection member.

53. The Mach-Zehnder optical modulator as claimed in claim 52, wherein said electrically conductive connection member comprises an Au ribbon.

54. The Mach-Zehnder optical modulator as claimed in claim 52, wherein said electrically conductive connection member comprises wiring.

55. The Mach-Zehnder optical modulator as claimed in claim 52, wherein said electrically conductive connection member comprises a strip.

56. A Mach-Zehnder optical modulator comprising:

a crystal substrate capable of causing an electro-optical effect, said crystal substrate comprising an active region, a first passive region in directly contact with a first side of said active region and a second passive region in directly contact with a second side opposite to said first side of said active region;

an optical waveguide extending over said active region and said first and second passive regions of said crystal substrate, said optical waveguide comprising a Y-shaped optical divider portion provided on said first passive region, first and second straight arm portions provided in parallel to each other on said active region and coupled to said Y-shaped optical divider portion, and a Y-shaped optical coupler portion provided on said second passive region and coupled to said first and second straight arm portions, and a top surface of said optical waveguide and a surface of said crystal substrate forming a flat surface;

a dielectric buffer layer extending over said flat surface;

a signal electrode selectively provided on said buffer layer over said first straight arm portion for applying an electric field through said dielectric layer to said first straight arm portion for causing said first straight arm portion to vary in refractive index profile in linear-proportion to an intensity of said electric field thereby causing phase shift of a light which is on propagation in said first straight arm portion;

a ground electrode selectively provided on said buffer layer over said second straight arm portion;

at least a pad connected with an end of said signal electrode, said pad being also selectively formed over said dielectric buffer layer; and a secondary substrate being in directly contact with said crystal substrate, a top surface of said secondary substrate having a higher level by a thickness of said dielectric buffer layer than a top surface of said crystal substrate so that said dielectric buffer layer does not extend over said secondary substrate and that the top surface of said secondary substrate has substantially the same level as a top surface of said dielectric buffer layer, wherein a recess is selectively formed in an upper region of said secondary substrate so that said recess is positioned in the vicinity of said pad, and wherein said dielectric buffer layer and said signal electrode are not formed over said recess so that said connector is received securely in said recess whereby a side face of said connector is made adjacent to a side face of said pad, and an electrically conductive connection member is provided to connect between top surfaces of said pad and said connector so as to allow microwave energy to travel between top surface regions of said pad and said connector through said electrically conductive connection member.

57. The Mach-Zehnder optical modulator as claimed in claim 56, wherein a top of said connector has substantially the same level as a top of said pad.

58. The Mach-Zehnder optical modulator as claimed in claim 56, wherein said electrically conductive connection member comprises an Au ribbon.

59. The Mach-Zehnder optical modulator as claimed in claim 56, wherein said electrically conductive connection member comprises wiring.

60. The Mach-Zehnder optical modulator as claimed in claim 56, wherein said electrically conductive connection member comprises a strip.

* * * * *